(12) United States Patent
McCollough et al.

(10) Patent No.: US 11,355,857 B2
(45) Date of Patent: Jun. 7, 2022

(54) DIRECTABLE ANTENNA SYSTEM AND METHOD FOR IMPROVED COMMUNICATIONS QUALITY

(71) Applicant: ELLUMEN, INC., Arlington, VA (US)

(72) Inventors: William J. McCollough, Earlysville, VA (US); Arezou Edalati, Arlington, VA (US); Todd R. McCollough, Barrington, IL (US)

(73) Assignee: ELLUMEN, INC., Silver Spring, MD (US)

( * ) Notice: Subject to any disclaimer, the term of this patent is extended or adjusted under 35 U.S.C. 154(b) by 824 days.

(21) Appl. No.: 15/923,209

(22) Filed: Mar. 16, 2018

(65) Prior Publication Data
US 2019/0036224 A1 Jan. 31, 2019

Related U.S. Application Data

(60) Provisional application No. 62/472,801, filed on Mar. 17, 2017, provisional application No. 62/472,833, filed on Mar. 17, 2017.

(51) Int. Cl.
*H04B 1/06* (2006.01)
*H01Q 15/00* (2006.01)
(Continued)

(52) U.S. Cl.
CPC .......... *H01Q 15/002* (2013.01); *H01Q 3/242* (2013.01); *H01Q 3/446* (2013.01); *H01Q 5/321* (2015.01);
(Continued)

(58) Field of Classification Search
CPC ........ H04B 1/16; H04B 7/0408; H04B 17/23; H04B 7/02; H04B 7/0802; H04B 7/0814; H01Q 15/002; H01Q 5/321; H04N 5/455
See application file for complete search history.

(56) References Cited

U.S. PATENT DOCUMENTS 5,663,639 A 9/1997 Brown et al.
6,498,939 B1 * 12/2002 Thomas ............... H04B 7/0408
455/279.1
(Continued)

FOREIGN PATENT DOCUMENTS

CN 102570034 A 7/2012
CN 102646869 A 8/2012
WO WO-2016/205396 A1 12/2016

OTHER PUBLICATIONS

Chao Gu et al., Dual-Band Electronically Beam-Switched Antenna Using Slot Active Frequency Selective Surface, IEEE Transactions on Antennas and Propagation, vol. 65, No. 3, Mar. 2017, pp. 1393-1398.
(Continued)

*Primary Examiner* — Nhan T Le
(74) *Attorney, Agent, or Firm* — Foley & Lardner LLP

(57) ABSTRACT

A directable antenna system includes at least one directable antenna which has an omnidirectional antenna at a center, an inner frequency selective surface centered around the omnidirectional antenna, and an outer frequency selective surface spaced from the inner frequency selective surface. An antenna control unit can vary antenna beamwidth by changing states of active elements of the inner and the outer frequency selective surfaces. The system may include a searchable database, for example, to direct the antenna in the optimum direction for transmission and reception at a particular location. Transmission and/or reception data from a second directable antenna can be used to aim the first directable antenna.

24 Claims, 20 Drawing Sheets

(51) Int. Cl.
| | |
|---|---|
| *H01Q 3/24* | (2006.01) |
| *H01Q 5/321* | (2015.01) |
| *H01Q 3/44* | (2006.01) |
| *H04B 7/08* | (2006.01) |
| *H04B 7/02* | (2018.01) |
| *H04B 7/0408* | (2017.01) |
| *H04B 17/23* | (2015.01) |
| *H04B 7/10* | (2017.01) |
| *H04B 1/16* | (2006.01) |
| *H01Q 19/18* | (2006.01) |
| *H04N 5/455* | (2006.01) |

(52) U.S. Cl.
CPC ................ *H04B 1/16* (2013.01); *H04B 7/02* (2013.01); *H04B 7/0408* (2013.01); *H04B 7/0802* (2013.01); *H04B 7/0814* (2013.01); *H04B 7/10* (2013.01); *H04B 17/23* (2015.01); *H01Q 19/18* (2013.01); *H04N 5/455* (2013.01)

(56) References Cited

U.S. PATENT DOCUMENTS

| | | | |
|---|---|---|---|
| 7,359,679 | B2 | 4/2008 | King et al. |
| 7,893,882 | B2 | 2/2011 | Shtrom |
| 9,088,309 | B2 | 7/2015 | Zander et al. |
| 9,287,941 | B2 | 3/2016 | Pajona et al. |
| 9,450,304 | B1 * | 9/2016 | Edalati ................ H01Q 15/002 |
| 2017/0318353 | A1 * | 11/2017 | Petruzzelli ......... H04N 21/4363 |

OTHER PUBLICATIONS

Jinxin Li et al., A Compact Dual-Band Beam-Sweeping Antenna Based on Active Frequency Selective Surfaces, IEEE Transactions on Antennas and Propagation, vol. 65, No. 4, Apr. 2017, pp. 1542-1549.

M. Chryssomallis, "Smart antennas," IEEE Antennas Propag. Mag., vol. 42, No. 47, pp. 129-136, 2000.

M-I. Lai, T.-Y. Wu, J.-C. Hsieh, C.-H. Wang, and S.-K. Jeng, "Compact switched-beam antenna employing a four-element slot antenna array for digital home applications," IEEE Trans. Antennas Propag., vol. 56, No. 9, pp. 2929-2936, 2008.

A. Alexiou and M. Haardt, "Smart antenna technologies for future wireless systems: Trends and challenges," IEEE Commun. Mag., pp. 90-97, Sep. 2004.

G. Cerri, R. D. Leo, V.M. Primiani, C. Monteverde, and P. Russo, "Design and prototyping of a switching beam disc antenna for wideband communications," IEEE Trans. Antennas Propag., vol. 54, No. 12, pp. 3721-3726, 2006.

B. A. Munk, Frequency Selective Surfaces Theory and Design. New York: Wiley, 2000.

R. J. Mittra, C. H. Chan, and T. A. Cwik, "Techniques for analyzing frequency selective surfaces—A review," Proc. IEEE, vol. 76, pp. 1593-1615, Dec. 1988.

J. P. Montgomery, "Scattering by an infinite periodic array of thin conductors on a dielectric sheet," IEEE Trans. Antennas Propag., vol. 23, pp. 70-75, Jan. 1975.

H. A. Kalhor, "Electromagnetic scattering by a dielectric slab loaded with a periodic array of strips over a ground plane," IEEE Trans. Antennas Propag., vol. 36, pp. 147-151, Jan. 1988.

A. Edalati et al., "Beam-switching Antenna Based on Active Frequency Selective Surfaces," IEEE , Department of Telecommunications, pp. 2254-2257, Jul. 2011.

A. Edalati et al., "Frequency Selective Surfaces for Beam-Switching Applications," IEEE Trans. Antennas Propag., vol. 61, No. 1, pp. 195-200, Jan. 2013.

E. Wang et al., "A electronically steerable radiator and reflector array antenna based on Three-Dimensional Frequency Selective Structure," 5$^{th}$ Global Symposium on Millimeter Waves, Harbin, China, pp. 119-122, May 2012.

L. Zhang et al., "A Novel Reconfigurable Antenna Based on Active Band Reflective Frequency Selective Surface," IEEE, School of Electronics and Information Engineering, Harbin Institute of Technology, Harbin, Heilongjiang, China, 2012.

Y-L Tsai et al., "A Reconfigurable Beam-Switching Antenna Base on Active FSS," Department of Electrical Engineering, National Chiao Tung University, Hsinchu, Taiwan, 2012.

M. Hajj et al., "Dual-Band EBG Sectoral Antenna Using a Single-Layer FSS for UMTS Application," IEEE Antennas and Wireless Propag. Letters, vol. 8, pp. 161-164, 2009.

W. Iiangyi et al., "Reconfigurable Sectoral Antenna Using An Cylindrical Frequency Selective Surface," School of Electronic Engineering, University of Electronic Science and Technology of China, Chengdu, China, 2012.

Arezou Edalati et al., "High-Gain Reconfigurable Sectoral Antenna Using an Active Cylindrical FSS Structure," IEEE Transactions on Antennas and Propagation, vol. 59, No. 7, Jul. 2011, pp. 2464-2472.

Arpan Pal et al., "Dual-Band Low-Profile Capacitively Coupled Beam-Steerable Square-Loop Antenna," IEEE Transactions on Antennas and Propagation, vol. 62, No. 3, Mar. 2014, pp. 1204-1211.

Chia-Chan Chang et al., "Design of a Beam Switching/Steering Butler Matrix for Phased Array System," IEEE Transactions on Antennas and Propagation, vol. 58, No. 2, Feb. 2010, pp. 367-374.

Don Parker et al., "Phased Arrays—Part II: Implementations, Applications, and Future Trends," IEEE Transactions on Microwave Theory and Techniques, vol. 50, No. 3, Mar. 2002, pp. 688-698.

Don Parker et al., "Phased-Arrays—Part I: Theory and Architectures," IEEE Transactions on Microwave Theory and Techniques, vol. 50, No. 3, Mar. 2002, pp. 678-687.

Guanfeng Cui et al., "A Compact Dual-Band Dual-Polarized Antenna for Base Station Application," Progress in Electromagnetics Research C, vol. 64, 2016, pp. 61-70.

Ian F. Akyildiz et al., "The Evolution to 4G Cellular Systems: LTE-Advanced," Physical Communications 3 (2010), pp. 217-244.

M. Maqsood et al., "Low-Cost Dual-Band Circularly Polarized Switched-Beam Array for Global Navigation Satellite System," IEEE Transactions on Antennas and Propagation, vol. 62, No. 4, Apr. 2014, pp. 1975-1982.

Mahmoud Niroo-Jazi et al., "Electronically Sweeping-Beam Antenna Using a New Cylindrical Frequency-Selective Surface," IEEE Transactions on Antennas and Propagation, vol. 61, No. 2, Feb. 2013, pp. 666-676.

Mohsen Sazegar et al., "Low-Cost Phased-Array Antenna Using Compact Tunable Phase Shifters Based on Ferroelectric Ceramics," IEEE Transactions on Microwave Theory and Techniques, vol. 59, No. 5, May 2011, pp. 1265-1273.

Mourad Nedil et al., "Novel Butler Matrix Using CPW Multilayer Technology," IEEE Transactions on Microwave Theory and Techniques, vol. 54, No. 1, Jan. 2006, pp. 499-507.

S. V. Shynu Nair and Max J. Ammann, "Reconfigurable Antenna with Elevation and Azimuth Beam Switching," IEEE Antennas Propag. Mag., vol. 9, 2010, pp. 367-370.

Tzung-Wern Chiou et al., "A Compact Dual-Band Dual-Polarized Patch Antenna for 900/1800-MHz Cellular Systems," IEEE Transactions on Antennas and Propagation, vol. 51, No. 8, Aug. 2003, pp. 1936-1940.

Viet-Anh Nguyen et al., "A Design of Multiband, Dual-Polarization, Beam-Switchable Dual-Antenna for Indoor Base Stations," Progress in Electromagnetics Research, vol. 149, 2014, pp. 147-160.

Xi-Wang Dai et al., "Dual-Band Microstrip Circular Patch Antenna with Monopolar Radiation Pattern," IEEE Antennas and Wireless Propagation Letters, vol. 15, 2016, pp. 1004-1007.

Yuehui Cui et al., "Novel Dual-Broadband Planar Antenna and Its Array for 2G/3G/LTE Base Stations," IEEE Transactions on Antennas and Propagation, vol. 61, No. 3, Mar. 2013, pp. 1132-1139.

* cited by examiner

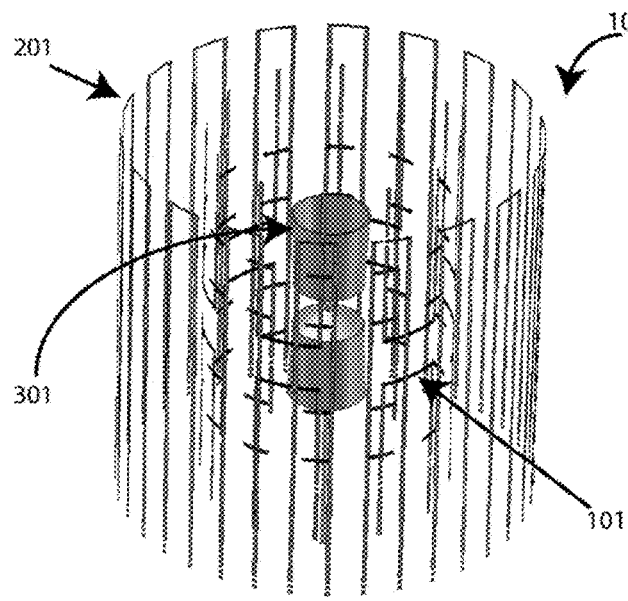 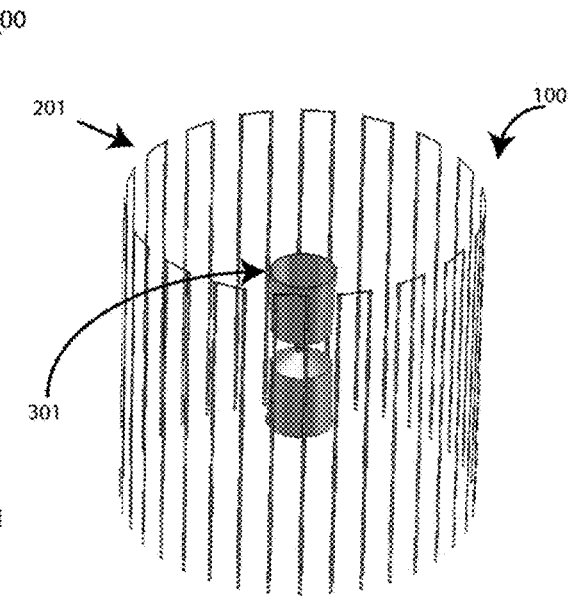
FIG. 1A  FIG. 1B
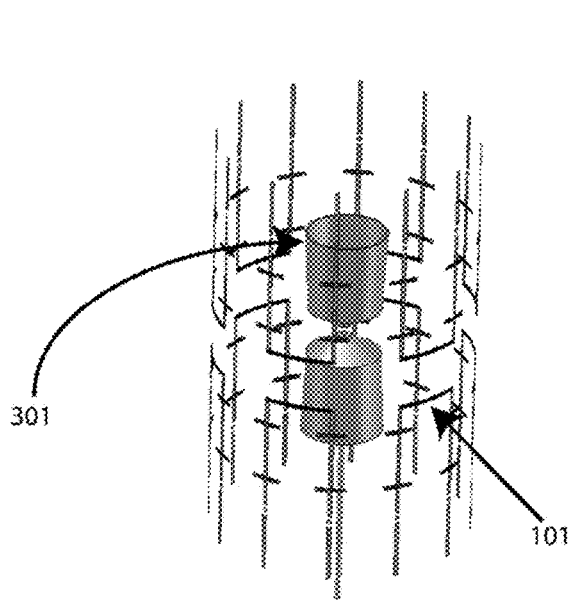 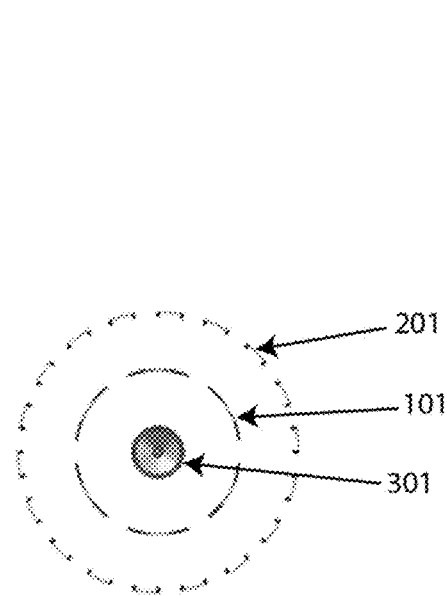
FIG. 1C  FIG. 1D

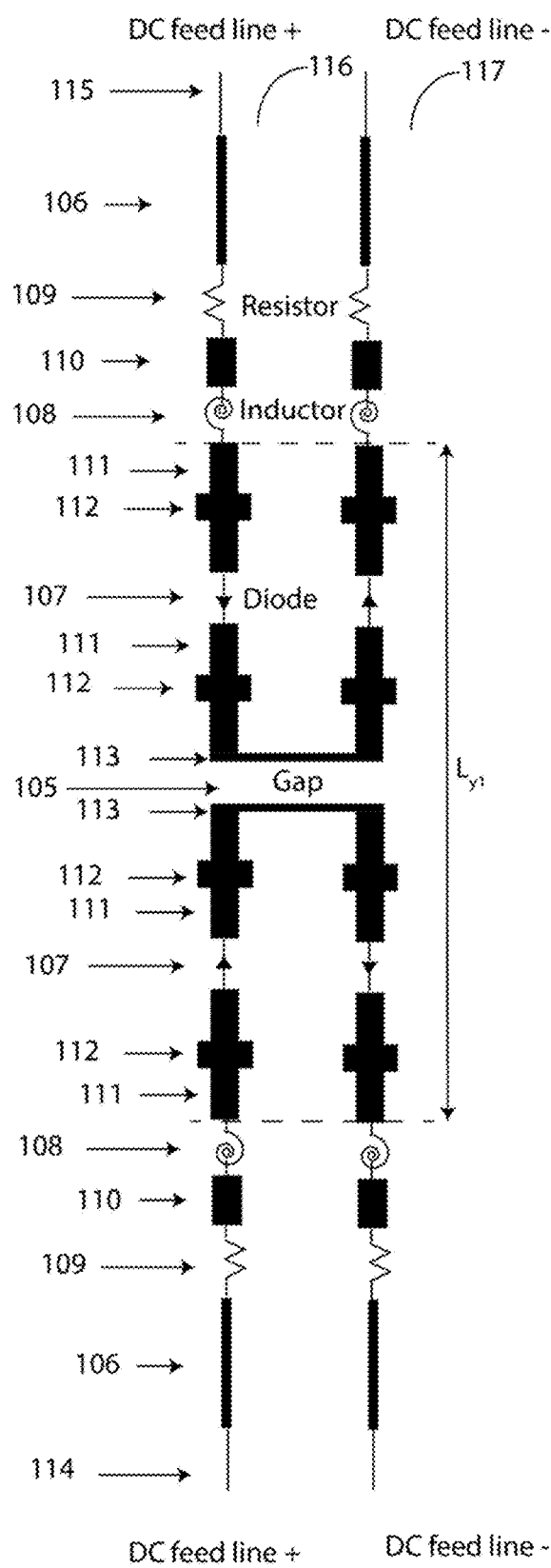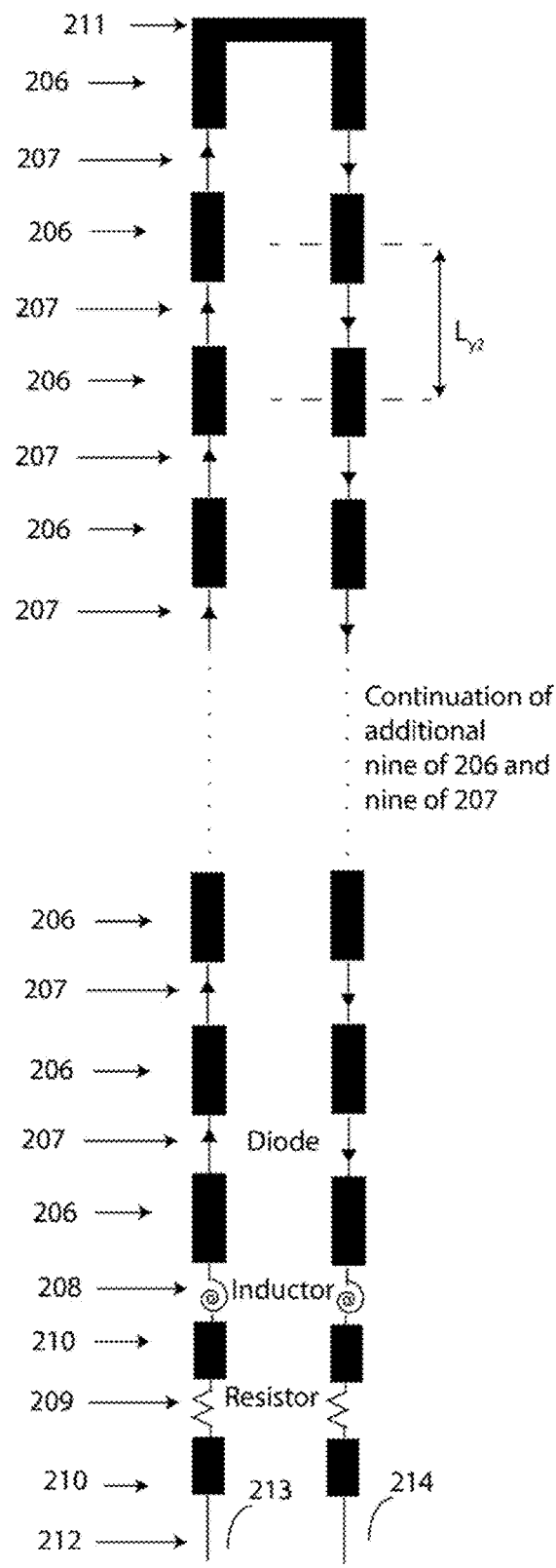
FIG. 2A
FIG. 2B

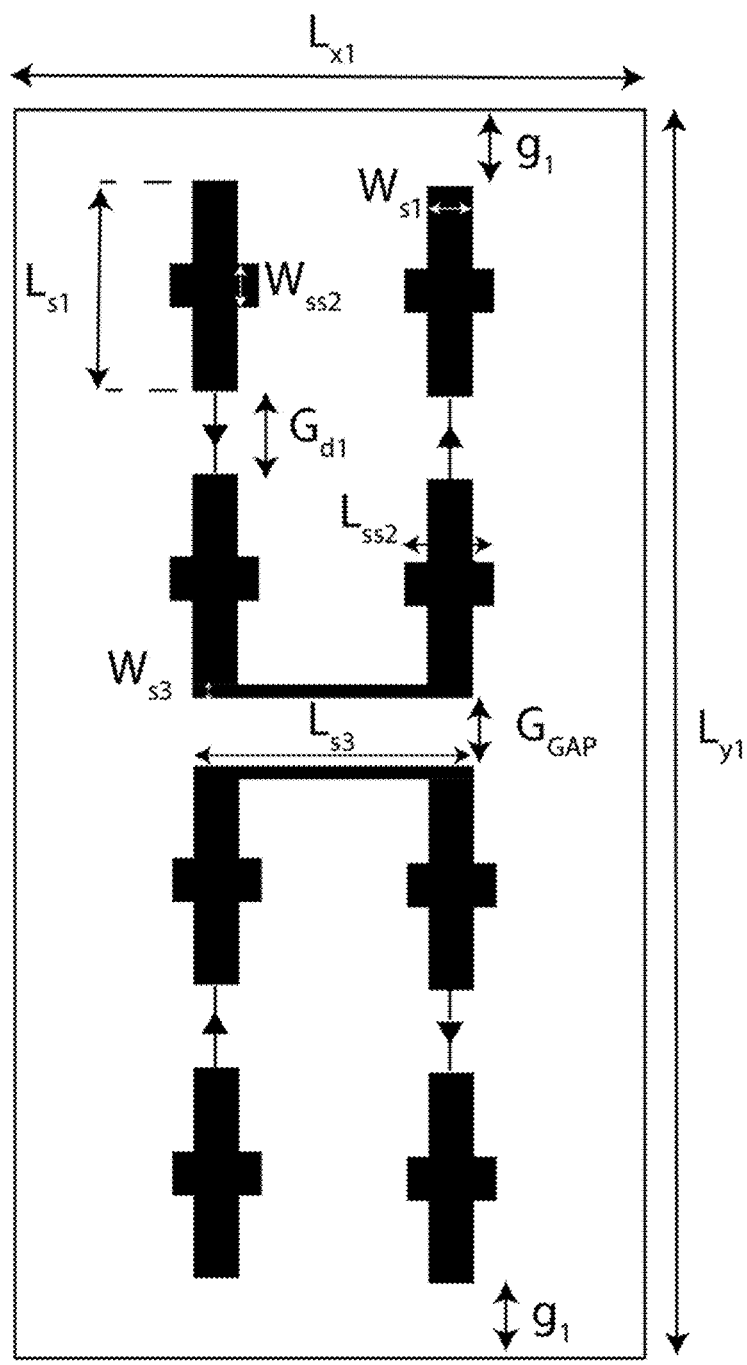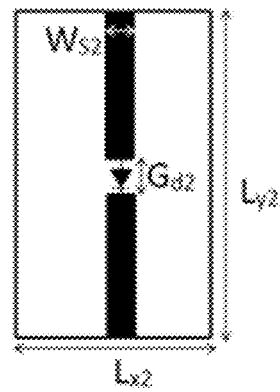
FIG. 8A
FIG. 8B

DIRECTABLE ANTENNA SYSTEM AND METHOD FOR IMPROVED COMMUNICATIONS QUALITY

BACKGROUND OF THE INVENTION

The present invention relates generally to antennas, and more specifically to switched beam antennas, beam scanning antennas, smart antennas, dual-band beam switching antennas, 3G/4G/Long Term Evolution (LTE) beam scanning antennas, smart over-the-air (OTA) television (TV) antennas, and reconfigurable directive antennas and how to use these antennas to improve communications resiliency and broadcast television reception.

The two main components in a cellular or radio frequency communications system are the base station and the mobile station. In typical cellular systems, geographically defined areas are referred to as cells, and there is one base station in each cell. All mobile stations are within the cell and communicate with the base station. The mobile stations communicate wirelessly with the base station, and the base station interfaces with a wired network for continued communications over the Internet, or over the plain old telephone system (POTS). The mobile stations communicate with the base station until they leave the geographical area defined by the cell. When the mobile station travels outside of the cell, the mobile station enters the range of another cell and starts communicating with another base station through a procedure known as hand-off, which occurs between the old and new base stations.

Demands for low cost, high quality, robust, and high data rate communication systems are increasing rapidly. Fortunately, wireless communication technology continues to rapidly grow. Novel technologies are being employed to enhance the quality and functionality of these wireless systems. One of these recent novel technologies are beam switching antennas. This technology also has use in broadcast television where the popularity of cord cutting continues to grow. Beam switching antennas are a smart antenna technology. They allow for energy savings, decrease multipath fading by directing the signal in a desired direction, and add more flexibility to the antenna—which increases functionality of the antenna and leads to good transmission quality. There are different methods for designing beam switching antennas. A conventional phased antenna array was initially thought as a promising solution for beam switching and beam steering applications. However, complex power distribution networks and phase shifters are necessary which increases the size and price of such designs. Another solution is using a Butler matrix, but integration of the matrix with an antenna array also is complex, requiring a large amount of space and inflating price. Recently, active Frequency Selective Surfaces (FSSs) have been used for designing reconfigurable and beam switching antennas to overcome the drawbacks of previous techniques. FSSs antennas scan the entire 360 degrees azimuth plane using a single source without using feeding networks or phase shifters.

SUMMARY OF THE INVENTION

Modern wireless communication systems must cover more than one frequency band simultaneously to provide multi services such as GSM, DCS, 3G/4G/LTE. Modern digital broadcast television systems must also cover more than one frequency band simultaneously to support both Ultra high frequency (UHF) and Very high frequency (VHF). Multi-band antennas have a better signal-to-noise ratio by using frequency diversity. Also, the accuracy of the system is enhanced when signals are received at multi-frequency bands. Therefore, it is needed to design a beam switching antenna to operate in more than one frequency band to support both modern communication networks and modern digital broadcast television.

Poor connectivity is a frustrating, sometimes life-threatening problem. One way to improve communications resiliency is to enhance communication quality by increasing signal strength so devices perform better in a weaker signal environment. Most TV transmitters or towers tend to be concentrated in urban areas. However, outside of major urban areas, the broadcast TV stations are distributed in different distances and directions from each particular user. One way to improve broadcast television reception is also by increasing signal strength so channels are received better in a weaker signal environment. Directional antennas offer greater signal strength over current technology. A high gain directional antenna with ability to find the direction of each broadcast TV station or each cellular tower and automatically point the main beam of the antenna to that specific direction is required to highly enhance the signal reception. A beam switching antenna can be used instead of an omnidirectional antenna and provide an affordable and almost instant upgrade to current communication systems and broadcast television systems by directing the transmission and reception of electromagnetic (EM) waves or radio frequency (RF) signals toward desired directions.

The present invention solves the drawbacks and problems occurring in other beam switching antenna systems. The present invention includes a novel design of a dual-band beam switching antenna based on reconfigurable frequency selective surfaces (FSSs) and the application of using one or multiple of these antennas to improve communications resiliency. The present invention also includes the application of using one of these antennas to improve digital terrestrial television or broadcast television reception. The present beam switching antenna provides a high gain and the capability of switching the direction of the transmission and reception of electromagnetic (EM) waves or radio frequency (RF) signals in the entire azimuth plane, of 360 degrees. Advantages of the present antenna design as compared to prior beam switching antenna designs include operating in two frequency bands simultaneously, allowing for use in wireless communication systems and digital broadcast television. The antenna uses a single source and simple feeding without the need of a power distribution system, a phase shifter, or other component. The antenna comprises both inner and outer layers of FSS surfaces. Beam switching is achieved with electronic modification of the active elements of the FSS using a controller. Therefore, no mechanical modifications are required. The present invention also provides the capability of switching the direction of the transmission and reception of EM waves or RF signals based on information stored in a database and/or information obtained from another antenna. The direction of the transmission and reception of EM waves or RF signals is varied in multiple directions and signal processing and analysis is performed to determine the optimal desired direction. The direction of the transmission and reception of EM waves or RF signals is pointed in a desired direction such as towards a base station, cell tower, or television (TV) tower where the signal is the strongest.

BRIEF DESCRIPTION OF THE DRAWINGS

FIG. 1A is a perspective view of the dual-band beam switching antenna showing both the outer and inner FSS layers according to an embodiment of the inventive concepts disclosed herein.

FIG. 1B is a perspective view of the dual-band beam switching antenna showing only the outer FSS layer according to an embodiment of the inventive concepts disclosed herein.

FIG. 1C is a perspective view of the dual-band beam switching antenna showing only the inner FSS layer according to an embodiment of the inventive concepts disclosed herein.

FIG. 1D is a top view of the dual-band beam switching antenna according to an embodiment of the inventive concepts disclosed herein.

FIG. 2A is a schematic illustrating two columns of the inner FSS layer according to an embodiment of the inventive concepts disclosed herein.

FIG. 2B is a schematic illustrating two columns of the outer FSS layer according to an embodiment of the inventive concepts disclosed herein.

FIG. 8A is a schematic illustrating a unit cell of two columns of the inner FSS layer according to an embodiment of the inventive concepts disclosed herein.

FIG. 8B is a schematic illustrating a unit cell of a column of the outer FSS layer according to an embodiment of the inventive concepts disclosed herein.

BRIEF DESCRIPTION OF THE TABLES

Figure 3:
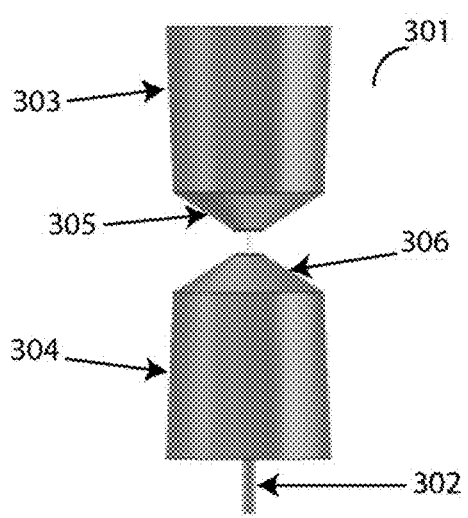
FIG. 3 is a side view of a broadband conical dipole comprising four cones, two on the top and two on the bottom, of the dual-band beam switching antenna according to an embodiment of the inventive concepts disclosed herein.
Figure 4A:
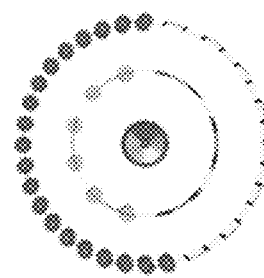
FIG. 4A is a top view of the dual-band beam switching antenna, showing 20 adjacent columns in the outer FSS layer with diodes turned on and 16 adjacent columns in the outer FSS layer with diodes turned off and 6 adjacent columns in the inner FSS layer with diodes turned on and 6 adjacent columns in the inner FSS layer with diodes turned off, directing the transmission and reception of electromagnetic waves towards 0 degrees, according to an embodiment of the inventive concepts disclosed herein.
Figure 4B:
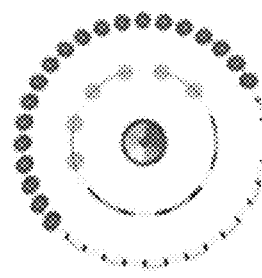
FIG. 4B is a top view of the dual-band beam switching antenna, showing 20 adjacent columns in the outer FSS layer with diodes turned on and 16 adjacent columns in the outer FSS layer with diodes turned off and 6 adjacent columns in the inner FSS layer with diodes turned on and 6 adjacent columns in the inner FSS layer with diodes turned off, directing the transmission and reception of electromagnetic waves towards 60 degrees, according to an embodiment of the inventive concepts disclosed herein.
Figure 4C:
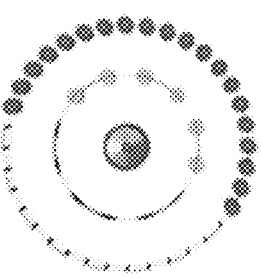
FIG. 4C is a top view of the dual-band beam switching antenna, showing 20 adjacent columns in the outer FSS layer with diodes turned on and 16 adjacent columns in the outer FSS layer with diodes turned off and 6 adjacent columns in the inner FSS layer with diodes turned on and 6 adjacent columns in the inner FSS layer with diodes turned off, directing the transmission and reception of electromagnetic waves towards 120 degrees, according to an embodiment of the inventive concepts disclosed herein.
Figure 4D:
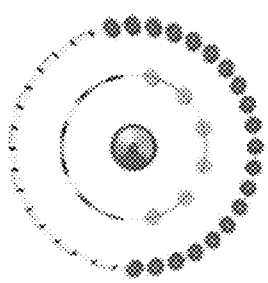
FIG. 4D is a top view of the dual-band beam switching antenna, showing 20 adjacent columns in the outer FSS layer with diodes turned on and 16 adjacent columns in the outer FSS layer with diodes turned off and 6 adjacent columns in the inner FSS layer with diodes turned on and 6 adjacent columns in the inner FSS layer with diodes turned off, directing the transmission and reception of electromagnetic waves towards 180 degrees, according to an embodiment of the inventive concepts disclosed herein.
Figure 4E:
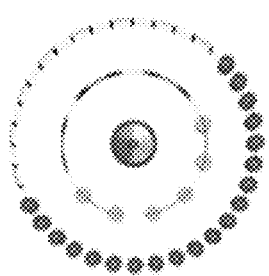
FIG. 4E is a top view of the dual-band beam switching antenna, showing 20 adjacent columns in the outer FSS layer with diodes turned on and 16 adjacent columns in the outer FSS layer with diodes turned off and 6 adjacent columns in the inner FSS layer with diodes turned on and 6 adjacent columns in the inner FSS layer with diodes turned off, directing the transmission and reception of electromagnetic waves towards 240 degrees, according to an embodiment of the inventive concepts disclosed herein.
Figure 4F:
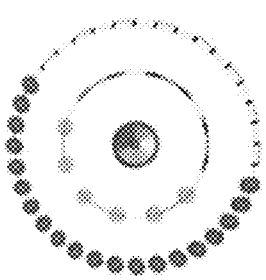
FIG. 4F is a top view of the dual-band beam switching antenna, showing 20 adjacent columns in the outer FSS layer with diodes turned on and 16 adjacent columns in the outer FSS layer with diodes turned off and 6 adjacent columns in the inner FSS layer with diodes turned on and 6 adjacent columns in the inner FSS layer with diodes turned off, directing the transmission and reception of electromagnetic waves towards 300 degrees, according to an embodiment of the inventive concepts disclosed herein.
Figure 4G:
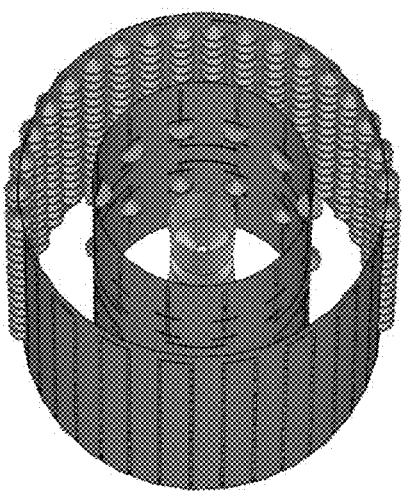
FIG. 4G is a perspective view of the dual-band beam switching antenna, showing 20 adjacent columns in the outer FSS layer with diodes turned on (diodes on are shown) and 16 adjacent columns in the outer FSS layer with diodes turned off (diodes off are not shown) and 6 adjacent columns in the inner FSS layer with diodes turned on (diodes on are shown) and 6 adjacent columns in the inner FSS layer with diodes turned off (diodes off are not shown), according to an embodiment of the inventive concepts disclosed herein.
Figure 4H:
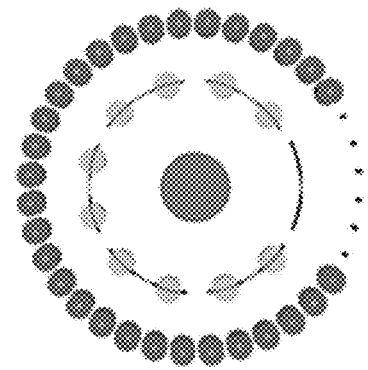
FIG. 4H is a top view of the dual-band beam switching antenna, showing 30 adjacent columns in the outer FSS layer with diodes turned on and 6 adjacent columns in the outer FSS layer with diodes turned off and 10 adjacent columns in the inner FSS layer with diodes turned on and 2 adjacent columns in the inner FSS layer with diodes turned off, directing the transmission and reception of electromagnetic waves towards 0 degrees, according to an embodiment of the inventive concepts disclosed herein.
Figure 4I:
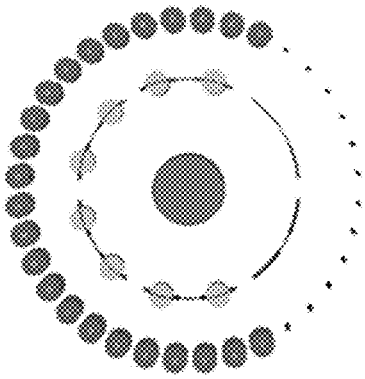
FIG. 4I is a top view of the dual-band beam switching antenna, showing 24 adjacent columns in the outer FSS layer with diodes turned on and 12 adjacent columns in the outer FSS layer with diodes turned off and 8 adjacent columns in the inner FSS layer with diodes turned on and 4 adjacent columns in the inner FSS layer with diodes turned off, directing the transmission and reception of electromagnetic waves towards 0 degrees, according to an embodiment of the inventive concepts disclosed herein.
Figure 4J:
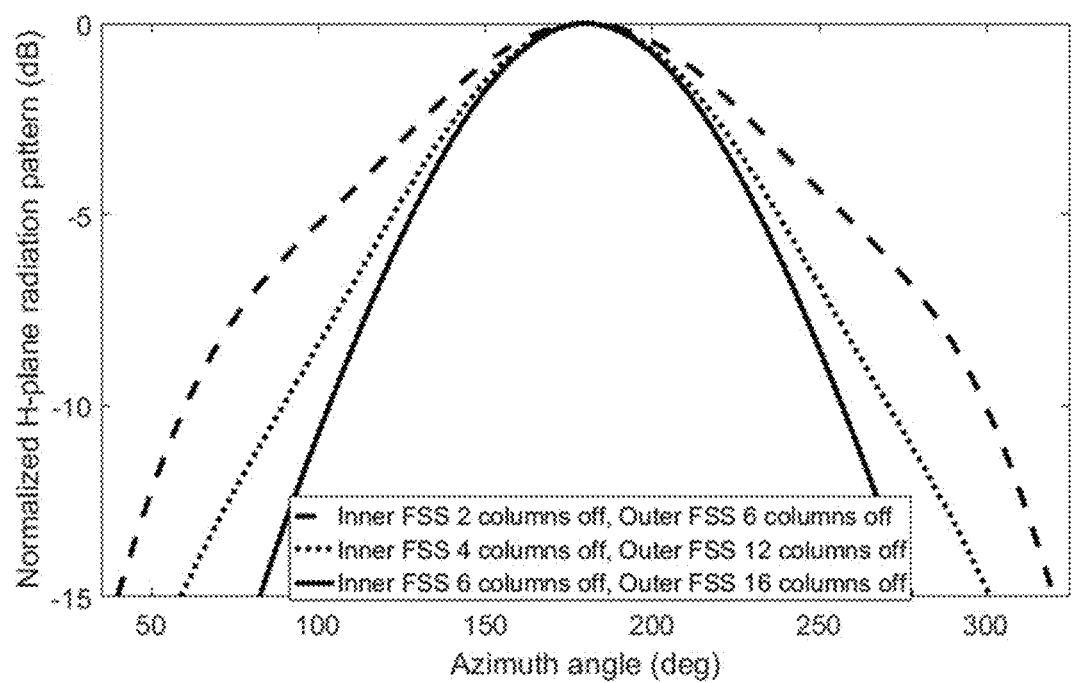
FIG. 4J is a graph which shows the beamwidth configurability of the dual-band beam switching antenna according to certain embodiments of the inventive concepts disclosed herein.

Table I shows the dimensions of the dual-band beam switching antenna, with a broadband conical dipole comprising four cones, two on the top and two on the bottom, in mm in an embodiment.

Table II shows the dimensions of unit cells of the dual-band beam switching antenna in mm in an embodiment.

Table III shows the range of possible dimensions of the dual-band beam switching antenna in mm utilized in certain embodiments.

Table IV shows the range of possible dimensions of FSS unit cells in mm utilized in certain embodiments.

Table V shows LTE frequency bands of interest in an embodiment.

Table VI shows UHF and VHF frequency bands of interest in an embodiment.

DETAILED DESCRIPTION OF CERTAIN EMBODIMENTS OF THE INVENTION

Presented herein is a novel design for a dual-band beam switching antenna based on reconfigurable frequency selective surfaces (FSSs) and the applications of using one or multiple of these antennas to improve communications resiliency and broadcast television reception. A discussion of a beam switching antenna based on active frequency selective surfaces is described in, for example, U.S. Pat. No. 9,450,304 entitled, "Beam Switching Antenna Based on Frequency Selective Surfaces," issued Sep. 20, 2016, which is incorporated by reference in its entirety for systems, methods, and techniques related to antennas, antenna systems, and use of information acquired from an antenna. Further discussion of a beam switching antenna to improve communications resiliency is described in, for example, U.S. Provisional Patent App. No. 62/472,833 entitled, "Directable Antenna System and Method for Improved Communications Quality," filed Mar. 17, 2017, and U.S. Provisional Patent App. No. 62/472,801 entitled, "Dual Band Beam Switching Antenna Based on Frequency Selective Surfaces," filed Mar. 17, 2017, which are incorporated by reference in their entirety. Additional background on frequency selective surfaces is disclosed in the text Ben A. Munk "Frequency Selective Surfaces: Theory and Design," Wiley, 2000, which is incorporated by reference in its entirety.

The dual-band beam switching antenna based on FSSs can operate in two frequency bands simultaneously, both a lower frequency band and a higher frequency band. FSSs are periodic structures composed of arrays of substantially identical elements with frequency dependent reflection and transmission coefficients. The FSSs are advantageously employed herein to direct the transmission and reception of incident electromagnetic (EM) waves or radio frequency (RF) signals.

FIGS. 1 A, B, C, and D illustrates an operational dual-band beam switching antenna based on FSSs 100 embodying certain concepts of the present invention. The preferred embodiment of the beam switching antenna 100 comprises two layers of cylindrical frequency selective surface (FSS) 101 and 201 referred to as inner FSS and outer FSS layers, respectively, constructed around a dipole 301 or other omnidirectional antenna, which is used as an excitation source. The omnidirectional antenna is dual-band or broadband. The inner FSS layer 101 and outer FSS layer 201 each comprises columns of discontinuous metallic strips shown as the darker dashes in FIG. 1 D. In certain embodiments, circular metallic plates 104 and 105 can be placed at the top and bottom of the cylindrical FSS 101 and 201 to enhance the radiation performance of the antenna 100. The metallic plates are preferably made of brass. In the preferred embodiment, it is not necessary to use any circular metallic plates 104 and 105 and thus this area is open.

The FSS 101 is a periodic structure composed of columns 116 and 117 of substantially identical elements repeated as a set around the dipole with frequency dependent reflection and transmission coefficients. The FSS 101 is advantageously employed to direct the transmission and reception of incident EM waves or RF signals. Each column 116 and 117 preferably comprises four middle metallic vertical strips 111, four middle metallic horizontal strips 112, two short metallic vertical strips 110, two long narrow metallic vertical strips 106, two PIN diodes (active elements) 107, two resistors 109, two inductors 108, and one gap 105 as shown in FIG. 2 A. The metallic strips form frequency selective material. Columns 116 and 117 are connected together by two long metallic horizontal strips 113 above and below the gap 105. Two long metallic vertical strips 106 are placed at the top and bottom of column 116 and 117. One of the resistors 109 is placed in between a short metallic vertical strip 110 and a long narrow metallic vertical strip 106. The metallic strips are preferably made of copper. In the preferred embodiment, the two resistors 109 are each 9.8 KΩ and the two inductors 108 are each 3.3 nH. The resistors 109 protect the diodes 107 and supply the same amount of current to each column. The inductors 108 work as a choke to block high frequency RF signals in a DC line, while passing DC current. The metallic strips 106, 110, 111, 112, and 113, the resistors 109, the inductors 108, and the diodes 107 are preferably mounted on a flexible substrate such as DiClad 880 from Rogers, which has a permittivity of 2.17, a thickness of 0.254 mm, and a loss tangent of 0.0013. High frequency PIN diodes such as MPP-4203 from Microsemi are preferably used as the diodes 107. In another embodiment RF-MEMS are used as switches instead of using PIN diodes 107. Each column 116 and 117 of the FSS is preferably fed separately with DC feeding lines 115 and 114 from the top and bottom.

The FSS 201 is a periodic structure composed of columns 213 and 214 of substantially identical elements repeated as a set around the dipole with frequency dependent reflection and transmission coefficients. The FSS 201 is advantageously employed to direct the transmission and reception of incident EM waves or RF signals. Each column 213 and 214 preferably comprises sixteen middle metallic vertical strips 206, two short metallic vertical strips 210, fifteen PIN diodes 207, one inductor 208, and one resistor 209 as shown in FIG. 2 B. Nine of the middle metallic strips 206 and nine of the PIN diodes 207 are not drawn (for brevity) and instead are represented by the dots representing a continuation of the elements. A short metallic vertical strip 210 is placed near the bottom of column 213 and 214. Columns 213 and 214 are connected together by one long metallic horizontal strip 211 at the top. The metallic strips are preferably made of copper. The resistor 209 is placed in between each set of two short metallic vertical strips 210. In the preferred embodiment, the two resistors 209 are each 120Ω and the inductor 208 is 3.3 nH. The resistors 209 protect the diodes 207 and supply the same amount of current to each column. The inductor 208 works as a choke to block high frequency RF signals in a DC line, while passing DC current. The metallic strips 206, 210, and 211, the resistor 209, the inductor 208, and the diodes 207 are preferably mounted on a flexible substrate such as DiClad 880 from Rogers, which has a permittivity of 2.17, a thickness of 0.254 mm, and a loss tangent of 0.0013. High frequency PIN diodes such as MPP-4203 from Microsemi are preferably used as the diodes 207. In another embodiment RF-MEMS are used as switches instead of using PIN diodes 207. Each column 213 and 214 of the FSS is preferably fed separately with DC feeding lines 212 from the bottom. The columns 116 and 117 are a basic building block of the FSS 101, and the columns 213 and 214 are a basic building block of the FSS 201. By repeating these materials around the dipole 301, two cylinders each with different radius from the center of the antenna 100 are created, and an extremely efficient and highly controlled dual-band beam switching mechanism is provided. The columns 116 and 117 of the FSS 101 and the columns 213 and 214 of the FSS 201 are single sided comprising simple discontinuous strips. The metallic patterns of the FSS structure, in this case, the simple discontinuous strips, are only on one side of the flexible substrate and the transmission and reflection coefficients only depends on the shape of the FSS. This allows for easier printed circuit board (PCB) fabrication of the antenna 100. If instead double-sided FSS structures were used, the metallic patterns of the FSS structure are on both sides of the flexible substrate. In this case, the transmission and reflection coefficients of the FSS surface not only depend on the shape of the FSS but also on the alignment of both sides. This causes PCB fabrication to be more sensitive and difficult.

In an embodiment, the two resistors 109 and the one resistor 209 are each in the range of 100Ω to 15 KΩ. The dimensions of the two resistors 109 and the one resistor 209 are each in the range of 0.5 mm to 4 mm. The length of two short metallic vertical strips 110 are each in the range of 1 to 5 mm and the length of the two short metallic vertical strips 210 are each in the range of 1 to 5 mm. The length of the two long narrow metallic vertical strips 106 are each in the range of 1 to 30 mm. In an embodiment the flexible substrate has thickness ranging from 0.05 mm to 2 mm, a permittivity ranging from 1 to 4, and loss tangent ranging from 0.0005 to 0.1. In some embodiments the resistors 109 and the resistors 209 are identical or different. In some embodiments the PIN diodes 107 and the PIN diodes 207 are identical or different.

Each column 116 and 117 and 213 and 214 of both the inner and outer FSS layers are fed with a DC feed line which are powered by a DC power supply. In a preferred embodiment, the DC feeding lines are first connected to a control unit. The control unit is a device or set of devices that control, manage, or command the operation of a system. The control unit is PLC (programmable logic controller), FPGA (field-programmable gate array), a laptop, or another type of programmable computer, processor or programmable controller.

The dipole 301 is a symmetric or an asymmetric broadband conical dipole comprising two identical or non-identical conductive elements, pushing towards each other comprising a cylinder portion or a cone portion, as shown with two cone portions in FIG. 3. The dipole 301 comprises large metallic cones 303 and 304, in the preferred embodiment, which are connected to small metallic cones 305 and 306. Using large cones instead of large cylinders allows the dipole to have wider bandwidth, so using one or the other depends on the application of interest. The dipole 301 is placed in the center of cylindrical FSSs 101 and 201 and is preferably fed through coaxial cable 302 from the bottom of the structure. The dipole is preferably fed with coaxial cable from the bottom where the outer conductor of the coaxial cable is connected to the bottom cone and the inner conductor of the coaxial cable is connected to the top cone. The other end of the coaxial cable is connected to cellular transceiver hardware for sending and receiving RF signals, known to those skilled in the art, and not discussed further for simplicity. In the preferred embodiment, a broadband conical dipole is used instead of a dual-band dipole so the resonance frequencies of the dual-band FSS antenna is defined by optimizing the radii of the FSS cylinders and not the resonance frequency of the dipoles. The broadband conical dipole has a bandwidth from frequency f1 to frequency f2 where f1 is smaller than or equal to the lowest operating frequency of the lower band (first band) of the dual-band beam switching FSS antenna and f2 is larger than or equal to the highest operating frequency of the upper band (second band) of the dual-band beam switching FSS antenna, which means the bandwidth of the wideband dipole covers both frequency bands of interest of the dual-band beam switching antenna. So, by adjusting the radius of each FSS layer each frequency band of the operation is defined. If instead a dual-band dipole were used as the radiating source, the dual-band dipole has two frequency bands; from frequency f11 to f12 and from frequency f21 to frequency f22, where the first operating band of f11 to f12 is almost the same as the first operating band (lower band) of the dual-band beam switching antenna and the second operating band of the dual band dipole of f21 to f22 is almost the same as the second operating band (upper band) of the dual-band beam switching antenna. In this case, the operating frequencies of the dual-band beam switching antenna are defined based on resonance frequencies of the dual-band dipole as well as the radius of the FSS cylinders.

The radius of the cylindrical FSS should be proportional to the antenna operating wavelength (radius of $\lambda/3$ is the design starting point where $\lambda$ is the wavelength of the operating frequency). In the dual-band beam switching antenna 100, as there are two different operating frequency bands simultaneously, the inner FSS layer 101 radius away from the center of the dipole 301 is defined by the higher frequency band of interest, and the outer FSS layer 201 radius away from the center of the dipole 201 is defined by the lower frequency band of interest as the starting point in the design. By optimizing the two radii away from the center of the dipole, the final frequency bands of operation are defined, so, the key in the design is to design the inner FSS layer transmissive at the lower frequency band at both on and off states to be able to achieve dual-band matching. In the final design, the inner FSS layer 101 and the outer FSS layer 201 have different radii away from the center of the dipole 301. The inner FSS layer 101 and the outer FSS layer 201 are spaced apart with an air gap of 35.9 mm in the preferred embodiment, but in other embodiments spaced apart in varying amounts ranging from 15 mm to 65 mm. The design method for the present antenna is different from the design method where instead a single FSS layer that is double sided is used for designing a dual-band beam switching FSS antenna. In the case of the single FSS layer that is double sided both operating frequencies are dependent on the radius of single layer FSS. The rest of the design considerations in the dual-band beam switching antenna 100 are the same as a single-band beam switching FSS antenna; both layers are highly reflective when diodes are on and transmissive when diodes are off at corresponding frequency bands (inner layer at the higher band and outer layer at the lower band). The inner FSS layer is transmissive at the lower frequency band in both the on and off state. The inner FSS layer is reflective in the on state and transmissive in the off state at the higher frequency band. The inner FSS layer at the high frequency band with off state diodes has a high transmission coefficient and allows the propagation of incident EM waves radiated from the dipole and allows for the reception of EM waves or RF signals. The inner FSS layer at the high frequency band with on states diodes has a high reflection coefficient meaning it is closed to or blocks the propagation of EM waves. The inner FSS layer at the low frequency band with both on and off state diodes has a low reflection coefficient and high transmission coefficient meaning it allows the transmission and reception of EM waves or RF signals. The outer FSS layer is a reflective surface in on state and transmissive in off state in both frequency bands. The outer FSS layer with off state diodes has a high transmission coefficient and allows the transmission of incident EM waves radiated from the dipole and reception of EM waves or RF signals. The outer FSS layer with on states diodes has a high reflection coefficient meaning it is closed to or blocks the propagation of EM waves.

The antenna 100 directs the main beam and the transmission and reception of EM waves or RF signals toward those columns that have diodes turned off. To radiate in a specific direction, the diodes in a specific number of adjacent columns in the FSS layers 101 and 201 facing the desired direction are turned off and the rest of the diodes are turned on. In the preferred embodiment, the inner FSS 101 has twelve columns total with six of 116 and six of 117 and the outer FSS 201 has thirty six columns total with eighteen of 213 and eighteen of 214. In the preferred embodiment there are two diodes in each column of inner FSS and fifteen diodes in each column of outer FSS. In the preferred embodiment, the antenna of 100 can have six steps of beam switching. The antenna 100 can scan the entire azimuth plane in six steps with an interval of sixty degrees of beam switching. For example, to scan the entire azimuth plane in a sixty degree interval, in each state of operation, all diodes in six adjacent columns of inner FSS layer 101 and all diodes in sixteen adjacent columns of outer FSS layer 201 are powered off; whereas the rest of the diodes in the rest of the columns of inner and outer FSS layers are kept on as shown in FIG. 4 A to F. In each of the six steps around the cylinder, all diodes in six columns of the inner FSS of 101 and all diodes in twenty columns of the outer FSS layer of 201, are supplied with DC voltage from the DC power supply to switch the diodes to the on state. Six columns in the inner FSS layer of 101, and sixteen columns in the outer FSS layer of 201, receive 0 volt from DC power supply and have their diodes in the off state.

FIG. 4 A to F shows all of the six possible positions of beam switching of the antenna 100 in the preferred embodiment and how a single diode in each column 116 and 117 and 213 and 214 of both FSS 101 and FSS 201, respectively, are turned on and off with a single diode in each column in each case. The remaining diodes in each column are not shown in the figures. By changing the states of diodes in the columns, the radiation pattern of the antenna is directed in different directions and the antenna can scan the entire azimuth plane. The single diode in each column in the on state are shown in bold (darker), and those in the off state are faintly shown. FIG. 4 A shows the orientation of the single diode in each column to direct the antenna at 0 degrees. Each new figure from FIG. 4 B to F represents how a single diode in each column changes as one rotates every 60 degrees in the clockwise orientation. The diodes that are all off define an off section and the diodes that are all on define an on section so that there are two separate and distinct sections. The single diode in each of six adjacent columns of inner FSS layer 101 and the diodes in each of sixteen adjacent columns of outer FSS layer 201 that are powered off, are all located near each other in each respective arc as shown. A perspective view of a state of the antenna operation in the preferred embodiment is shown in FIG. 4 G when using six adjacent columns of inner FSS and sixteen adjacent columns of outer FSS with diodes off, and the rest are on.

The antenna 100 can operate with more or less columns of diodes in on and off states than in the preferred embodiment, which changes the antenna beamwidth. The number of columns of FSS layer with diodes off in the inner and outer layers defines the beamwidth of the antenna. The radiation beamwidth is changed by changing the number of on and off columns in the inner and outer layers. For example, the antenna can operate when all diodes of two, four, or six adjacent columns of FSS in the inner FSS layer 101 and six, twelve, or sixteen adjacent columns in the outer FSS layer 201, respectively, are off, while the rest of diodes in the remaining columns are on. In each case, the beamwidth of the antenna is different, which means the antenna has an ability to have a reconfigurable beamwidth based on specific applications and user demands while scanning the entire azimuth plane. FIG. 4 H shows the 0 degree position when using two adjacent columns of inner FSS and six adjacent columns of outer FSS with diodes off, and the rest are on. FIG. 4 I shows the 0 degree position when using four adjacent columns of inner FSS and twelve adjacent columns of outer FSS with diodes off, and the rest are on. As shown in FIG. 4 J, the 3 dB beamwidth of the antenna is configured to be 108 degrees, 87 degrees, and 80 degrees when all diodes in each of two inner FSS columns and six outer FSS columns, four inner FSS columns and twelve outer FSS columns, and six inner FSS columns and sixteen FSS columns are in the off state and the rest of the diodes in the remaining columns are in the on state, respectively.

Figure 5:
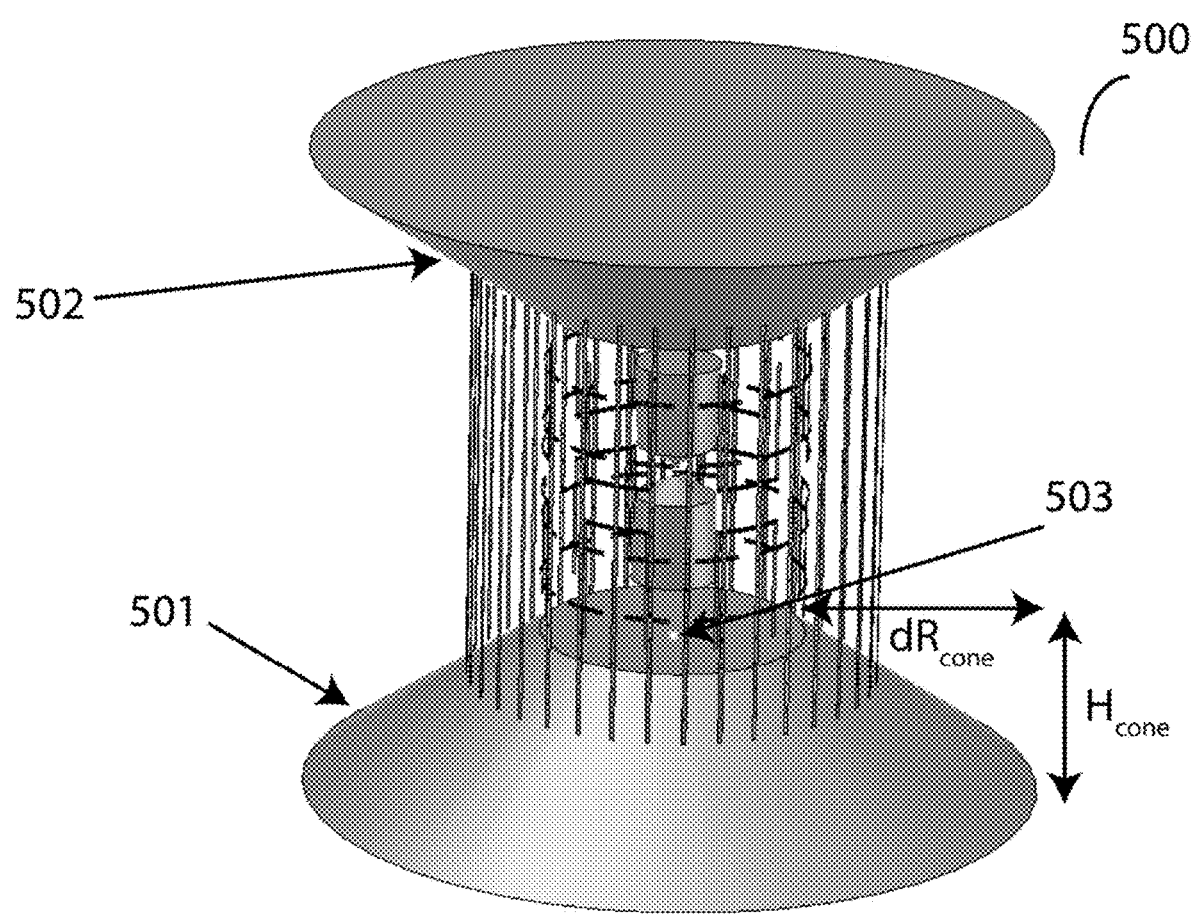
FIG. 5 is a side view of a metallic cone added to the dual-band beam switching antenna according to an embodiment of the inventive concepts disclosed herein.

As shown in FIG. 5, it is possible to add metallic cones 501 and 502 to the antenna 100 to improve the antenna gain especially at the upper frequency band. Preferably, the cone is made of any metal such as brass. There is a small hole 503 at the bottom cone 501 allowing access for RF feeding coaxial cable 302.

Figure 6:
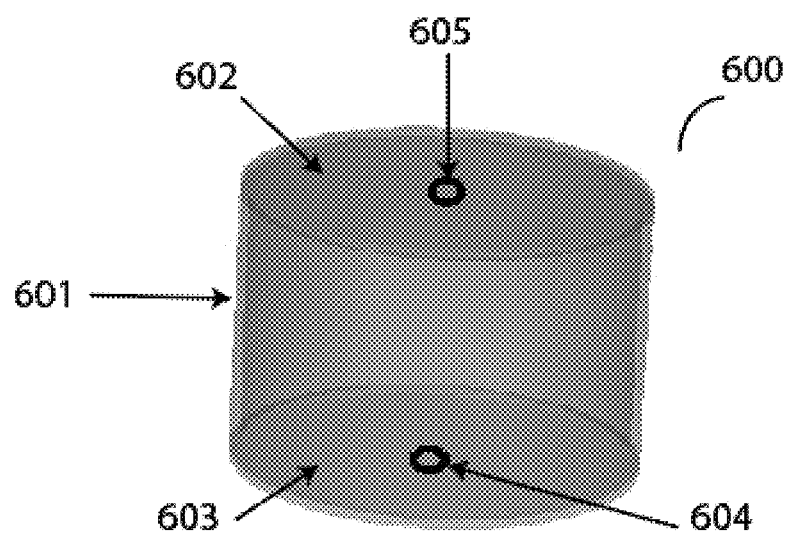
FIG. 6 is a perspective view of a radome that the dual-band beam switching antenna is placed in for environmental protection according to an embodiment of the inventive concepts disclosed herein.

To protect the antenna from the environment, a radome 600 can be used as shown in FIG. 6. The radome ideally has minimal impact on the antenna performance and transmission and reception characteristics of the antenna while also protecting the antenna from wind, snow, rain, sand, insects, hail, UV damage, and temperature changes which can all affect the antenna's ability to function optimally and properly. The radome 600 comprises a cylinder 601 covered at the top and bottom with circular plates 602 and 603. The antenna of 100 is placed inside the radome 600. When the antenna is used with metallic cones, the antenna and cone combination 500 are placed inside the radome 600. In the preferred embodiment, the radome 600 is ideally made with a dielectric material of low dielectric constant and low loss tangent to have minimal effect on the antenna performance. The dielectric materials include polyurethane, polypropylene (PP), polyethylene (PE), polyvinyl chloride (PVC), polystyrene (PS) and other low permittivity and low loss materials. In other embodiments, the radome is made of multi-layer dielectric materials. The materials the radome 600 is made of ideally allow for high transmission and reception of EM waves or RF signals and low reflection and low loss. There is a small hole 604 inside the circular plate 603 to allow access to RF feeding coaxial cable 302 and DC feeding wires 114 and 212 to allow them to connect to the RF source and the DC power supply, respectively. There is a small hole 605 inside the circular plate 602 to allow access to DC feeding wires 115 to allow them to connect the DC power supply.

The antenna 100 has two modes of operation. In the first mode, the desired direction of the beam and direction to transmit and/or receive EM waves or RF signals is known (out of the six possible directions every sixty degrees in the preferred embodiment) and using the control unit diodes are powered on or off by supplying them with DC voltage. In the preferred embodiment, two diodes in each of six adjacent columns in the inner FSS 101 and fifteen diodes in each of sixteen adjacent columns in the outer FSS 201 corresponding to the direction of transmission and/or reception receive 0 volts from the DC power supply so they are in the off state and the rest of the diodes are supplied with DC voltage so they are in the on state. The diodes have their states changed for example by typing a command in a control unit or pushing a button.

The second mode is when the desired direction of the beam and direction to transmit and/or receive EM waves or RF signals is unknown. In this case, the antenna operates as a smart antenna. The control unit makes the antenna scan the entire azimuth plane in six steps, one by one, in the preferred embodiment. By comparison of received signals, a final decision about the direction to use for the direction of transmission and/or reception is made and sent to the control unit (for example the direction is set as that which maximizes the signal or is determined to be the best signal based on signal strength). The control unit then makes the appropriate DC power distribution for the diodes. In the preferred embodiment, two diodes in each of six adjacent columns in the inner FSS 101 and fifteen diodes in each of sixteen adjacent columns in the outer FSS 201 corresponding to the direction of transmission and/or reception receive 0 volts from the DC power supply so they are in the off state while the rest of the diodes are supplied with DC voltage so they are in the on state. When the dipole is excited by a radio frequency (RF) source, the EM waves are transmitted in the direction selected by the control unit.

In a specific embodiment of the second mode of operation, a RF source is used to excite the dipole antenna. An antenna controller causes the antenna to switch the direction of the radiation over the entire azimuth plane for each of the six possible directions every sixty degrees. The signals for each direction are received and studied and compared. The appropriate direction of transmission is determined based on the received signals, for example, the direction of the maximum received signal is determined as the desired direction. Data associated with the desired direction of the radiation is sent to the controller. The controller makes the appropriate DC power distribution of the diodes of both the inner FSS 101 and outer FSS 201. The diodes in the columns corresponding to the direction that will transmit and receive a signal, receive 0 volt DC and are in the off state. The other diodes receive V volt DC where V is a positive or negative number and are in the on state.

In the preferred embodiment, when using six adjacent columns of inner FSS and sixteen adjacent columns of outer FSS with diodes off, and the rest are on, the antenna 100 operates at two frequency bands of 0.7 GHz to 1.1 GHz (a lower frequency band) and 1.7 GHz to 2.3 GHz (an upper frequency band) simultaneously, with gain of 4 dBi to near 8.5 dBi in the lower frequency band and 7 dBi to 10 dBi in the upper frequency band. In an embodiment where a metallic cone is added to the top and bottom of the antenna 100, the gain in the upper frequency band is from 7 dBi to 12 dBi.

I. Antenna Schematic and FSS Unit Cells

Figure 7A:
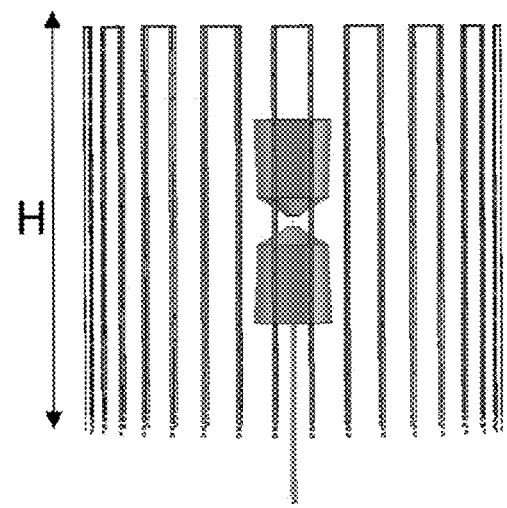
FIG. 7A is a side view schematic of the dual-band beam switching antenna (inner FSS layer not shown) according to an embodiment of the inventive concepts disclosed herein.
Figure 7B:
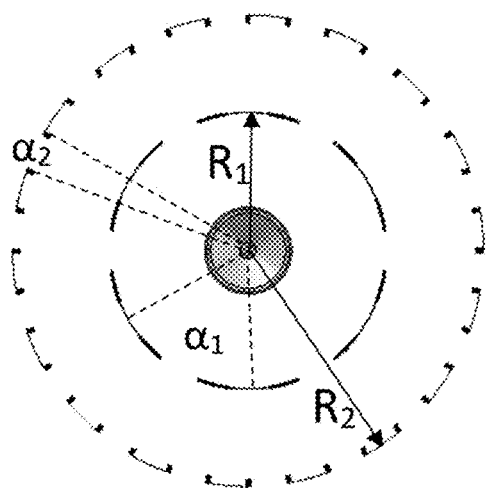
FIG. 7B is a top view schematic of the dual-band beam switching antenna according to an embodiment of the inventive concepts disclosed herein.
Figure 7C:
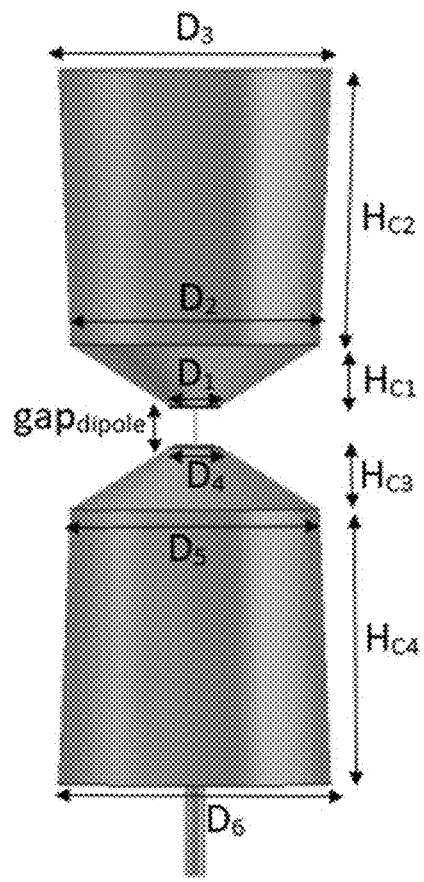
FIG. 7C is a side view schematic of a broadband conical dipole comprising four cones, two on the top and two on the bottom, of the dual-band beam switching antenna according to an embodiment of the inventive concepts disclosed herein.

The schematic of the dual-band beam switching antenna 100, in a specific embodiment, is presented in FIGS. 7 A, B, and C. The height H of the antenna is shown in FIG. 7 A. The antenna comprises two layers of cylindrical active FSSs as shown in FIG. 7 B and a broadband conical dipole at the center as presented in an embodiment in FIG. 7 C. The radius from the center of the dipole of the inner FSS layer 101 ($R_1$) and the radius from the center of the dipole of the outer FSS layer 201 ($R_2$) are different. The angle between each column 116 and 117 of the inner FSS 101 ($\alpha_1$), and the angle between each column 213 and 214 of the outer FSS 201 ($\alpha_2$), directly depends on the total number of columns in their respective FSS. The wideband dipole comprises two identical or non-identical large cylinders or large cones with heights of $H_{c2}$ and $H_{c4}$ and diameters of $D_2$, $D_3$, $D_5$, and $D_6$. The large cones or large cylinders of the wideband dipole are identical when the heights of $H_{c2}$ and $H_{c4}$, along with the diameters, are equal. The large cones become equivalent to large cylinders when the diameters $D_2$ and $D_3$ and the diameters $D_5$ and $D_6$ are equal. The wideband dipole comprises two identical or non-identical small cones with heights of $H_{c1}$ and $H_{c3}$ and diameters of $D_1$, $D_2$, $D_4$, and $D_5$. The small cones of the wideband dipole are identical when the heights of $H_{c1}$ and $H_{c3}$, along with the diameters, are equal. The dimensions of the dual-band beam switching antenna in the preferred embodiment are shown in Table I (in mm).

The schematic of the unit cells of the cylindrical active FSS structures for the inner and outer layers 101 and 201 of the antenna 100 are presented in FIGS. 8 A and B. Each unit cell fits into each column 116 and 117 and each column 213 and 214 of both the inner and outer FSS layers where a single unit cell is shown with a dashed line in both FIGS. 2 A and B. The total height of each column 116 and 117 is the same or different from each column 213 and 214, but ideally if different, is close in total height (as in within 10 mm apart). The dimensions of the unit cells of the dual-band beam switching antenna in the preferred embodiment are shown in Table II (in mm).

Figure 9A:
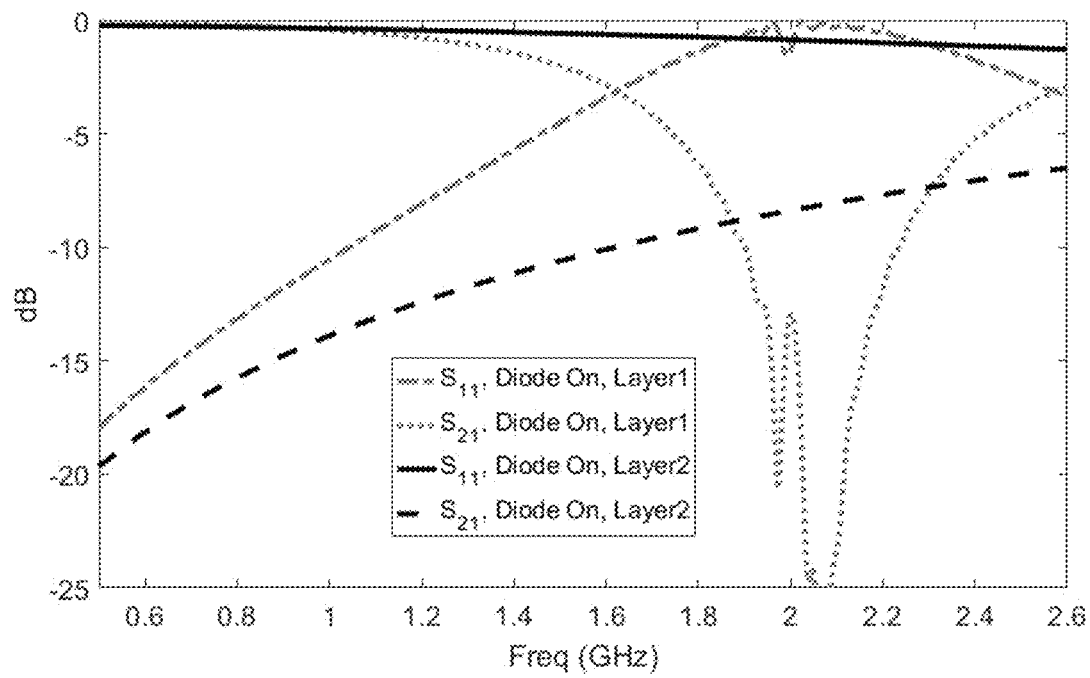
FIG. 9A is a graph which shows the transmission and reflection coefficients of the inner and outer FSS layers with diodes on according to an embodiment of the inventive concepts disclosed herein.
Figure 9B:
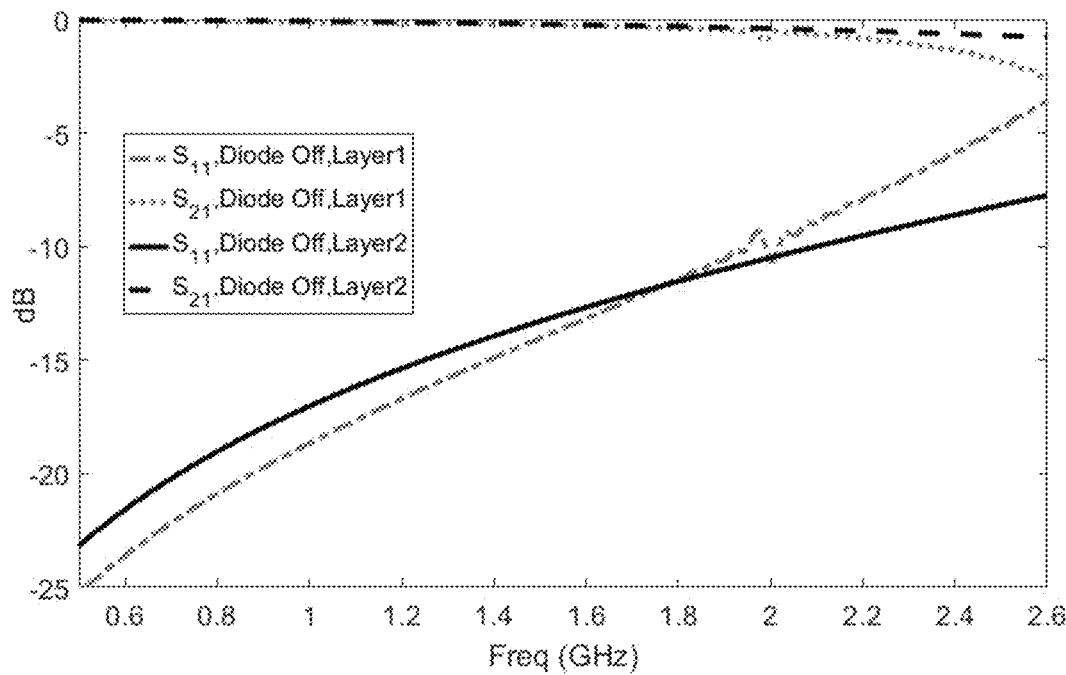
FIG. 9B is a graph which shows the transmission and reflection coefficients of the inner and outer FSS layers with diodes off according to an embodiment of the inventive concepts disclosed herein.

As mentioned earlier, in the preferred embodiment, each column 116 and 117 of inner FSS layer has two diodes and each column 213 and 214 of outer FSS layer has fifteen diodes resulting in 564 total diodes. Each column of inner FSS layer has two high value resistors of $R_{DC}$=9.8 KΩ, one at the top of each column and one at the bottom of each column, and each column of outer FSS layer has one resistor of $R_{DC}$=120Ω, one at the bottom of each column, to protect the diodes and to provide equivalent current for each diode. To bias the diodes, DC voltage of 21 Volts is required to provide 1 mA current for each column of FSS when the diodes are powered on. The transmission ($S_{21}$) and reflection ($S_{11}$) coefficients of the inner FSS (layer 1) 101 and the outer (layer 2) FSS 201 are shown in FIGS. 9 A and B using the preferred embodiment and the dimensions presented in Table I and Table II. The FSS unit cells are simulated using CST MWS, where the PIN diode is modeled with a resistor $R_{on}$=3Ω in the on state, and a parallel RC circuit with $C_{off}$=100 fF and $R_{off}$=30 KΩ in the off state.

II. Antenna Results

Figure 10A:
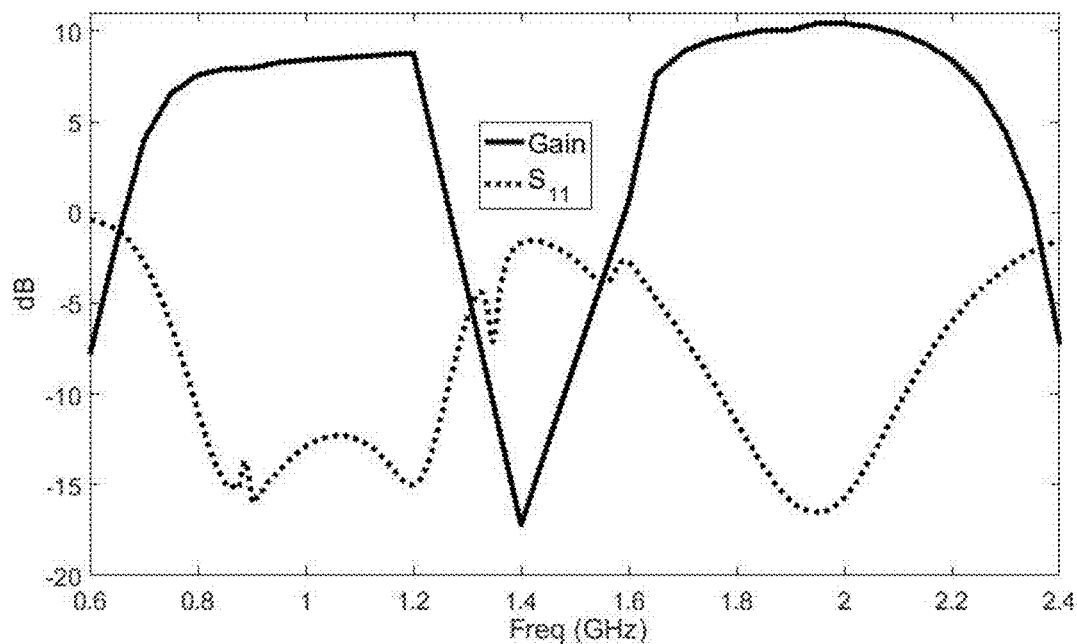
FIG. 10A is a graph which shows the matching and realized gain over the frequency range 0.6 GHz to 2.4 GHz for the dual-band beam switching antenna according to an embodiment of the inventive concepts disclosed herein.
Figure 10B:
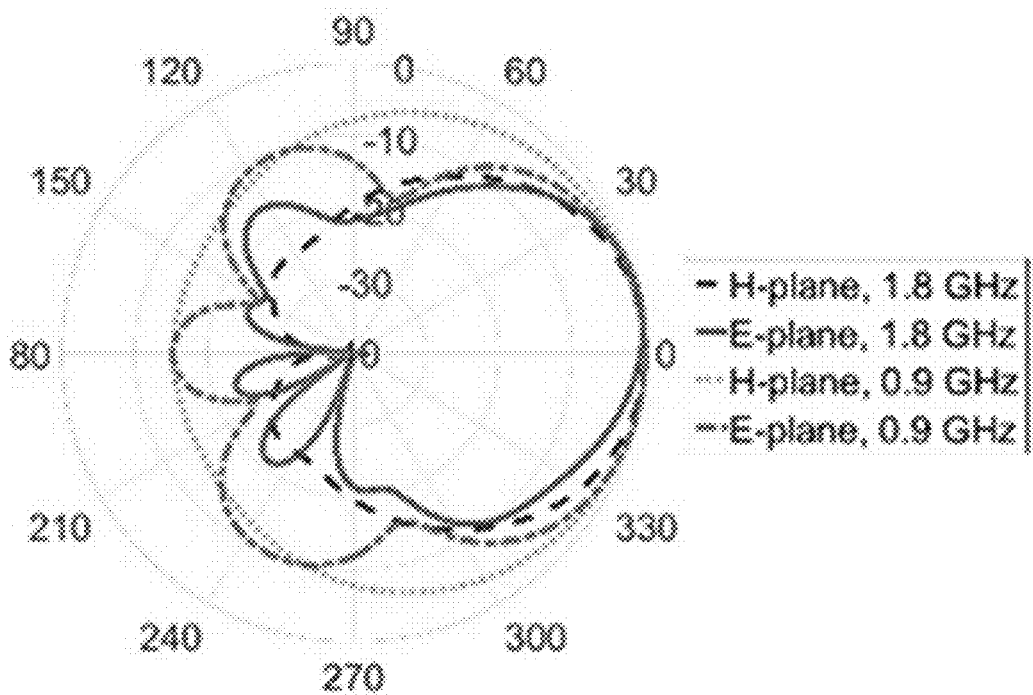
FIG. 10B shows the radiation patterns in the E- and H-planes for the dual-band beam switching antenna according to an embodiment of the inventive concepts disclosed herein.

The antenna 100 is matched from 0.7 GHz to 1.1 GHz with gain of 4 dBi to near 8.5 dBi, and from 1.7 GHz to 2.3 GHz with gain of 7 dBi to 10 dBi as shown in FIG. 10 A, using the preferred embodiment and the dimensions presented in Table I and Table II. The E-plane and H-plane radiation patterns of the antenna at 0.9 GHz and 1.8 GHz are shown in FIG. 10 B. FIGS. 10 A and B shows results as in the preferred embodiment, with two diodes in each of six adjacent columns in the inner FSS 101 and fifteen diodes in each of sixteen adjacent columns in the outer FSS 201 in the off state while the rest of the diodes are in the on state.

III. Parametric Studies

To show the effect of the design parameters on the antenna radiation performances, parametric studies can be conducted where design parameters vary from the preferred embodiment. The radii of the inner and outer FSS cylinder defines the antenna operating and realized gain. As the antenna realized gain is related to $S_{11}$, by changing $R_1$ and $R_2$, antenna gain is affected. The dipole 301 design parameters have an important role on antenna matching and antenna realized gain as well. Changing the height of the top ($H_{c2}$) and bottom ($H_{c4}$) large cylinders or cones of the dipole 301 changes the antenna matching. The diameter of the cylinders or cones of the dipole ($D_2$ and $D_5$) and the height of the small cones of the dipole ($H_{c1}$ and $H_{c}$) change the $S_{11}$ level and the realized gain. When using a metallic cone in certain embodiments, the cone height $H_{cone}$ and the radius of the cone beyond the outer FSS, $dR_{cone}$=cone radius–$R_2$, as shown in FIG. 5, for a metallic cone 501 or 502 also has an effect on antenna gain.

The antenna design is modified to work over different frequency bands depending on specific applications and regions of interest where specific frequency bands are needed for data and voice communications and broadcast television reception. Depending on the application of interest, the dual-band beam switching antenna may be designed for different frequencies.

Dimensions of various antenna dimensions are altered and selected based on additional parametric studies and optimization. The possible range of dimensions of the dual-band beam switching antenna 100 in certain embodiments are presented in Table III and Table IV.

IV. Applications: Directable Antenna for General Use

Figure 11:
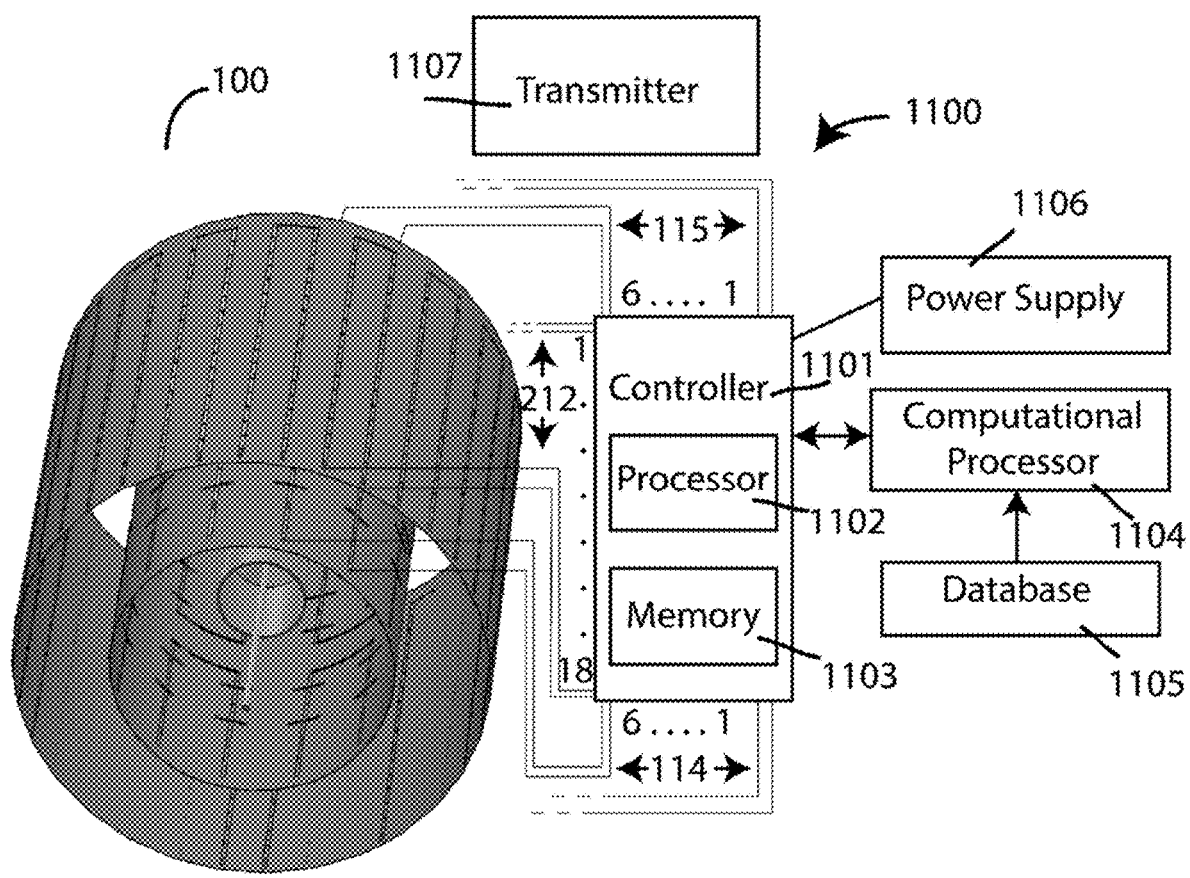
FIG. 11 is a schematic illustrating an antenna system with a directable antenna, a controller, a computational processor, and a database according to an embodiment of the inventive concepts disclosed herein.

Providing the ability to selectively transmit and/or receive in any direction has uses in many areas including tactical situations for the military, wireless LAN systems, base station applications, broadcast television, and radars. The antenna of 100 is used in various applications where altering the direction of the communication and the direction to point the main beam of the antenna and transmission and/or reception of EM waves or RF signals is useful. FIG. 11 shows a schematic of an antenna system 1100 that allows for the selective transmission and/or reception of EM waves or RF signals in any direction. The antenna system 1100 includes a directable antenna which in the preferred embodiment is a dual-band beam switching antenna 100. The antenna 100 is configured to direct the transmission and reception of EM waves or RF signals. The antenna system 1100 further includes a controller 1101 configured to control the direction of the transmission and reception of EM waves or RF signals by controlling active elements of frequency selective surfaces of the antenna 100 to either block or allow transmission and reception of EM waves or RF signals. The controller is further configured to make the appropriate DC power distribution of the diodes in each column of frequency selective surfaces of the antenna 100. The diodes in the columns corresponding to the direction that will transmit and receive a signal, receive 0 volt DC and are in the off state. The other diodes receive V volt DC where V is a positive or negative number and are in the on state. The controller 1101 may further be configured to receive an EM wave or RF signal after it has been received by the antenna 100. The controller 1101 may comprise a processor 1102 and a memory 1103 so as to allow the controller 1101 to perform its control functions. The controller 1101 may be hardwired and/or may contain software and programs to allow the controller 1101 to perform its control functions.

The antenna system 1100 may include a computational processor 1104 which receives EM waves or RF signals from the controller 1101 and data from a database 1105. The computational processor 1104 is configured to analyze received EM waves or RF signals and may be further configured to perform comparisons to determine which direction of the received EM waves or RF signals provide maximal signal strength. The data in database 1105 may be prior collected and analyzed received EM waves or RF signals, transmitter or tower information, and location information of transmitters or towers. The antenna system 1100 comprises a power supply 1106 that provides power to the controller 1101 which then provides DC power to antenna 100 via DC feed lines. In the preferred embodiment, the power supply 1106 provides 21 V of power. The antenna 100 is further configured to receive RF signals from a transmitter 1107. In an embodiment, the transmitter 1107 may include more than one transmitter. In an embodiment, the transmitter 1107 is a cell tower corresponding to a certain cellular carrier or a television (TV) tower corresponding to a certain TV channel in a certain geographical region. The transmitter 1107 may broadcast different types of signals at different frequencies. The transmitter 1107 may be located a variable distance and angle away from the antenna 100. The controller 1101 uses dedicated DC feeding lines 114, 115, and 212 to selectively provide current to columns of the inner and outer FSS. Each DC feeding line provides power to one column.

The controller 1101 is further configured to receive data associated with the desired direction of the transmission and reception of EM waves or RF signals from the computational processor 1104. In the preferred embodiment, the antenna controller causes the antenna to switch the direction of the transmission and reception of EM waves or RF signals over the entire azimuth plane for each of six possible directions every sixty degrees. The computational processor 1104 may comprise one or more subprocessors. The computational processor 1104 is not just limited to one processor and may contain at least two processors which employ parallel computing techniques. In addition, the computation processor 1104 may comprise both central processing units and graphics processing units. The computation processor 1104 and database 1105 may be remote from the antenna 100 and controller 1101. Remote as used herein can mean in a different building in addition to meaning many miles away.

V. Applications: Directable Antenna for 3G/4G/LTE

One particular area of application for the antenna of 100 is in public safety and emergency medical services (EMS) where saving a patient's life is a matter of life and death. There tends to be less resilient cell phone coverage in most communities outside of major urban areas. The U.S. Census estimates 37% of Americans live outside of cities including areas where cellular voice, data, and GPS communications are not always reliable. In large cities, lack of many cell towers in certain areas, tall buildings, steep hills, and a high volume of calls can lead to unreliable voice, data, and GPS communications. Cell phones, and the data plans they offer (i.e. LTE, 3G/4G, etc.), are sometimes the only communications options available to EMS (emergency medical services) and FR (first responders) in many rural areas. Voice communications are provided through Voice over LTE (VoLTE) or through Voice over IP (VoIP). Currently all mobile transceivers use omnidirectional antennas that spans the entire azimuth plane of 360 degrees. Omnidirectional antennas are used due to the mobile nature of EMS and FR. If instead, antennas that had higher gain were used, the communications capability of most current systems would be vastly improved. The main drawback of higher gain antennas are narrower coverage areas as opposed to a wide coverage area. In order to maintain a reliable communications link, the directional antenna must be able to 'point' to the best cell tower (or other type of transmitter). This is where the dual-band beam switching FSS antennas are used together with other components to help improve wireless cellular and internet connectivity as they provide higher gain than omnidirectional antennas.

Most 4G LTE signals used by commercial cellular carriers for communications operate at frequency bands shown in Table V for data communications to provide coverage in the U.S. and across the world. This is not an all-inclusive list; however, of all the LTE frequency bands used throughout the world. For use with LTE frequencies, the antenna 100 ideally provides high gain at a lower frequency band between 699 MHz and 960 MHz and at a higher frequency band between 1710 MHz and 2690 MHz. In an embodiment, the dimensions of the antenna 100 are altered so that the antenna 100 provides high gain near and within the frequency bands or a subset of the frequency bands listed in Table V. The antenna design allows operation in LTE frequency band 14 which is designated the FirstNet communications band in the U.S. Background on broadband and cellular networks are disclosed in the text Paul Bedell "Cellular Networks: Design and Operation—A Real World Perspective," Outskirts Press, 2014, and in Lennard G. Kruger, "The First Responder Network (FirstNet) and Next-Generation Communications for Public Safety: Issues for Congress," Congressional Research Service, Jan. 26, 2017, which are incorporated by reference in their entirety, for details on broadband and cellular networks.

Figure 12:
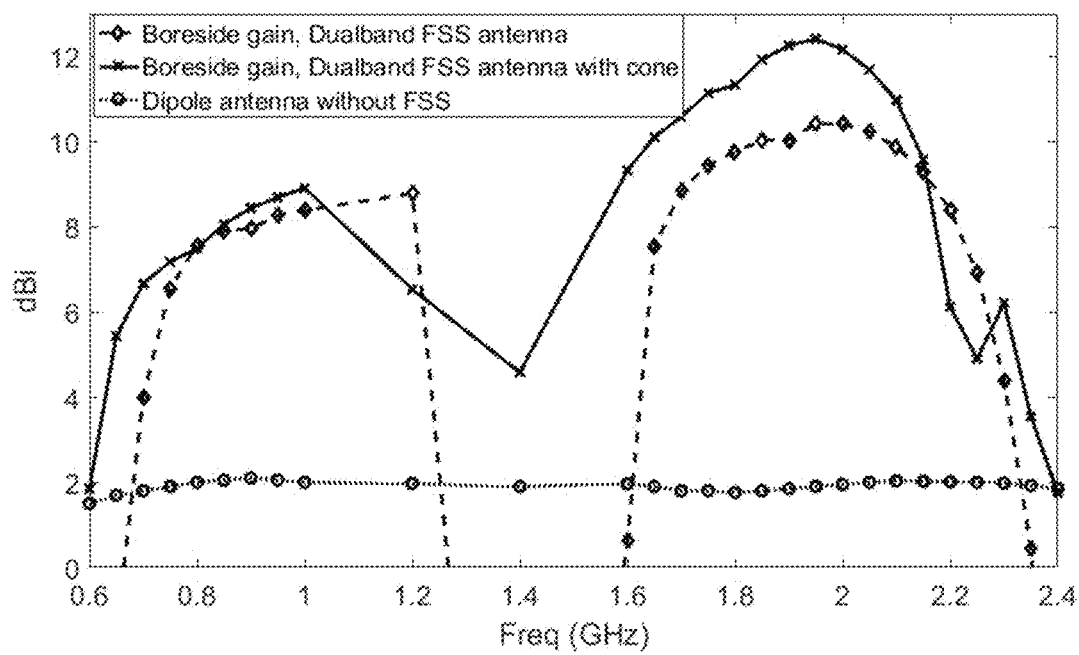
FIG. 12 is a graph which shows the gain over the frequency range 0.6 GHz to 2.4 GHz of a typical omnidirectional dipole antenna compared to the dual-band beam switching antenna without and with a metallic cone added on the top and the bottom according to certain embodiments of the inventive concepts disclosed herein.

The dual-band beam switching FSS antenna can provide power to just a specific direction instead of all directions as it is electronically steerable. As cell towers are typically located in certain directions away, using the dual-band beam switching FSS antenna to selectively point towards a cell tower can thus raise the gain, improve the signal to noise ratio (SNR), and boost the signal strength allowing for more reliable communications. A typical omnidirectional antenna (labeled dipole antenna without FSS) has around 2 dBi or slightly less of gain over frequencies of interest as shown in FIG. 12. On the other hand, the dual-band beam switching FSS antenna from 0.7 GHz to 1.1 GHz has a gain of 4 dBi to near 8.5 dBi and from 1.7 GHz to 2.3 GHz a gain of 7 dBi to 10 dBi. When the dual-band beam switching FSS antenna has a cone placed on the top and bottom, as illustrated in FIG. 5, even further increases in gain are seen near the two frequency bands of interest. The improved gain of this antenna is the difference in establishing consistent communications in low-signal rural or first responder situations. Additionally, due to the antenna characteristics it also provides some anti jam capability due to the fact that interference from outside communications sources are physically filtered out.

Figure 13:
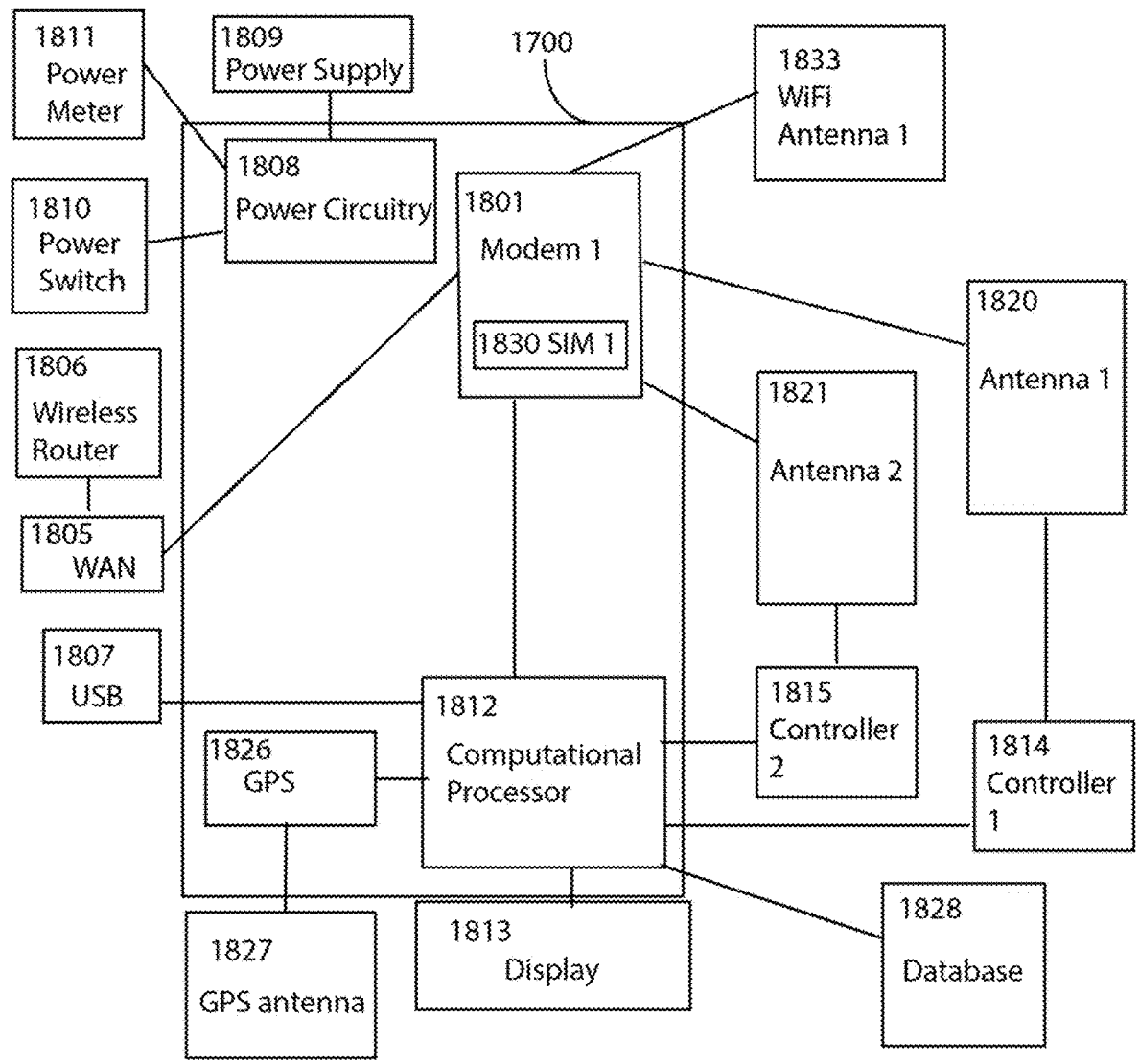
FIG. 13 is a schematic of a device utilizing two dual-band beam switching antennas with one modem according to an embodiment of the inventive concepts disclosed herein.

According to an embodiment in FIG. 13, a device 1700 is primarily placed in a fixed position inside a vehicle with antennas mounted on either the top or sides of the vehicle. This device 1700 is used in a vehicle such as an ambulance or fire truck so personnel can provide better emergency services to the community. The device 1700 contains one modem 1801 corresponding to a cell phone carrier such as U.S. Cellular, AT&T, Verizon, T-Mobile, or Sprint. The modem 1801 includes a slot for a SIM card 1830. A SIM card is inserted into a SIM slot. In some embodiments, multiple slots for SIM cards are used allowing for multiple SIM cards. In the case of multiple SIM slots, multiple SIM cards are used corresponding to different cellular carriers. This allows for a single modem to be used on multiple cellular carrier networks. In the case of multiple SIM cards, one of the SIM cards will be designated as the primary and will be the one used for the cellular carrier network. A WAN port 1805 is connected to the modem 1801 through the use of RJ45 Ethernet cable. An Ethernet cable from the WAN port 1805 to a wireless router 1806 is connected so internet is broadcast wirelessly or in a wired connection via the wireless router 1806. A Universal Serial Bus (USB) connection 1807 can allow for any peripheral connections such as a keyboard and is connected to the computational processor 1812. Power circuitry requires a 24 V power supply 1809 to provide power to device 1700 and the associated components. Different power supplies for power supply 1809 are used as long as it provides 24 V DC. It is powered through a cigarette lighter in a vehicle, a standalone battery, or draws power through a solar panel mounted on the vehicle. A power switch 1810 allows for power to be switched on or off to device 1700. A power meter 1811 displays and provides information to the user about the current power load such as the voltage, current, wattage, and energy.

A computational processor 1812 contains a program to indicate the signal strength of signals received for the carrier from the modem 1801. In the preferred embodiment, computational processor 1812 is connected to the modem 1801 using RS-232 cable. The signal strength is displayed via a display 1813 to a user such as passengers in the vehicle using a graphical user interface. The graphical user interface displayed via a display 1813 also in some cases accepts input from a user. The computational processor 1812 also performs signal processing and analysis of received signals. In some embodiments the computational processor is part of a Raspberry Pi device. Two separate antenna controls 1814 and 1815, control two separate antennas 1820 and 1821, which are mounted on the top or sides of the vehicle. The antennas 1820 and 1821 are connected to the modem 1801 via SMA connectors. In the preferred embodiment, each antenna is a dual-band beam switching antenna and each is one of antenna 100. In other embodiments, other types of beam switching antennas can be used such as an antenna array, substrate integrated waveguide switched beam antenna, and a metamaterial based beam switching antenna. Each of the two antenna controls 1814 and 1815 are connected to the computational processor 1812. Each of the antennas 1820 and 1821 transmit signals and receive signals such as 4G LTE signals which are sent to the modem 1801. One of the antennas is always used for current reception whereas the other antenna (known as diversity) can be used to find the best direction, such as where signal is maximum, to direct the other antenna or can also be used for current reception as well. In some embodiments, a metallic cone is placed above and below each of the dual-band beam switching FSS antennas to improve the gain of the antennas at the lower frequency band. In addition, it decreases the effect of the reflection from the top of the vehicle as the top of the vehicle is a large reflective surface which can impede antenna operation. In some embodiments, each of the dual-band beam switching antennas are placed in a radome. In some embodiments, the modem performs two, three, or multiple channel carrier aggregation on the 4G LTE signals received and thus are LTE-Advanced capable. Multi-channel carrier aggregation technology allows transmissions across different LTE spectrum bands to be combined to provide faster data speeds. For example, two channel carrier aggregation can combine LTE band 1 and band 8.

Device 1700 also includes one WiFi antenna 1833 which is used to connect to WiFi hotspots. The WiFi antenna is connected to modem 1801 via an SMA connector. In some embodiments, multiple WiFi antennas are used and each of them separately connected to modem 1801 via their own SMA connector. Device 1700 also contains a Global Positioning System (GPS) 1826 so the longitude and latitude location information of the current position of the device 1700 (and hence the vehicle) is known. The GPS 1826 uses a GPS antenna 1827 to properly get the current GPS data. The GPS antenna 1827 is connected to the GPS 1826 via an SMA connector. The computational processor 1812 receives the current GPS data and saves them into a database 1828. The GPS data includes the current latitude and longitude, the current altitude, the current acceleration, speed, and direction, and the number of GPS satellites used to provide the information. The current GPS data and best direction of radiation found for the carrier are saved into the database 1828. Power circuitry 1808 draws power from power supply 1809 to provide power to modem 1801, wireless router 1806, computational processor 1812, display 1813, controller 1814, controller 1815, GPS 1826, and GPS antenna 1827. The antennas 1820 and 1821 draw power via their corresponding controller. In some embodiments it is possible to use multiple power supplies 1809 and have each one only power certain components.

Figure 14:
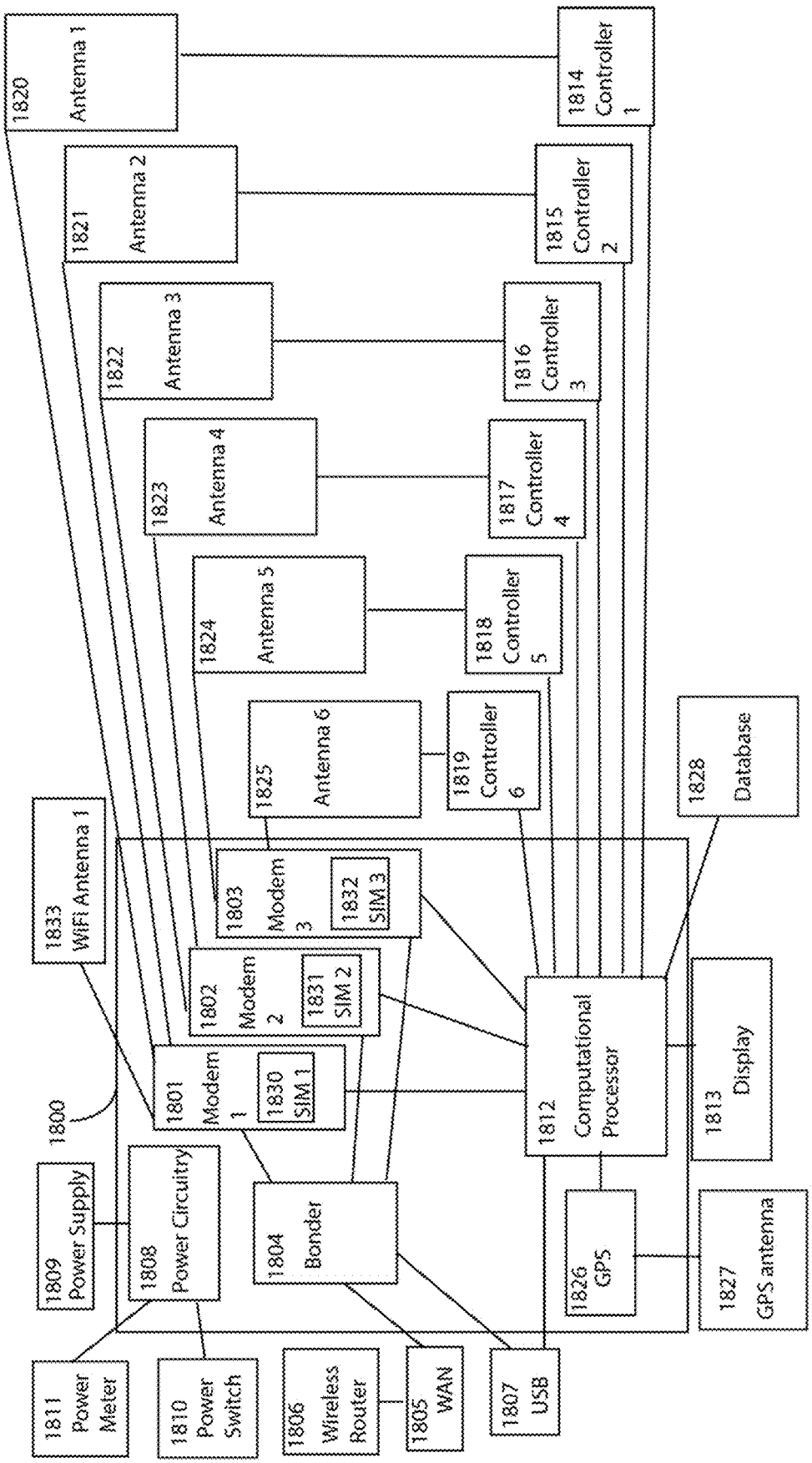
FIG. 14 is a schematic of a device utilizing six dual-band beam switching antennas with three modems according to an embodiment of the inventive concepts disclosed herein.

According to another embodiment in FIG. 14, a device 1800 is primarily placed in a fixed position inside a vehicle with antennas mounted on either the top or sides of the vehicle. The device 1800 contains three separate modems 1801, 1802, and 1803, corresponding to different cell phone carriers such as U.S. Cellular, AT&T, Verizon, T-Mobile, or Sprint. Each modem includes their own SIM slot 1830, 1831, and 1832. A SIM card is placed into the SIM slot corresponding to the cellular carrier network. In some embodiments, multiple slots for SIM cards are used, allowing for multiple SIM cards. The three modems are connected into a bonder 1804 which can use only one of the carriers or use more than one as an aggregate at the same time. The purpose of the bonder is to provide the most stable and best connection based on all three possible carriers. In some cases, the bonder can use more than one carrier simultaneously to provide the best connection. When using more than one carrier simultaneously, better data throughput than just one carrier alone and double or triple the connectivity is achieved in some cases. The bonder can switch between various carriers seamlessly without experiencing any drops in coverage. As such, connectivity is clear and reliable even when it has to switch to different carriers. A WAN port 1805 is connected to the bonder 1804 through the use of RJ45 Ethernet cable. An Ethernet cable from the WAN port 1805 to a wireless router 1806 is connected so internet is broadcast wirelessly or available in a wired connection via the wireless router 1806. A USB connection 1807 allows for any peripheral connections such as a keyboard and is connected to the bonder 1804 and computational processor 1812. In some embodiments, the USB connection 1807 may only be connected to either bonder 1804 or computational processor 1812. Power circuitry requires a 24 V power supply 1809 to provide power to device 1800 and the associated components. A power switch 1810 allows for power to be switched on or off to device 1800. A power meter 1811 displays and provides information to the user about the current power load.

A computational processor 1812 contains a program to indicate the signal strength of signals received from each of the individual carriers from each modem 1801, 1802, and 1803. In the preferred embodiment, computational processor 1812 is connected to each modem 1801, 1802, and 1803 using RS-232 cable. The computational processor 1812 can in some embodiments determine the frequency band of the received signals and the appropriate carrier. The signal strength is displayed via a display 1813 to a user using a graphical user interface. The computational processor 1812 performs signal processing and analysis of received signals. Six separate antenna controls 1814, 1815, 1816, 1817, 1818, and 1819 control six separate antennas 1820, 1821, 1822, 1823, 1824, and 1825 which are mounted on the top or sides of the vehicle. The antennas 1820, 1821, 1822, 1823, 1824, and 1825 are connected to the modems 1801, 1802, and 1803 via SMA connectors. In the preferred embodiment, each antenna is a dual-band beam switching antenna and each is one of antenna 100. In other embodiments, other types of beam switching antennas can be used such as an antenna array, substrate integrated waveguide switched beam antenna, and a metamaterial based beam switching antenna. Each of the six antenna controls 1814, 1815, 1816, 1817, 1818, and 1819 are connected to the computational processor 1812. Each of the six antennas 1820, 1821, 1822, 1823, 1824, and 1825 receive signals such as 4G LTE signals which are sent to their corresponding modem 1801, 1802, or 1803. Three of the antennas are always used for current reception whereas the other three antennas (known as diversity) can be used to find the best direction, such as where signal is maximum, to direct the corresponding antenna on the same network or also used for current reception as well. In this way, modem 1801 corresponds to controller 1814 and 1815 and connects to antenna 1820 and 1821, modem 1802 corresponds to controller 1816 and 1817 and connects to antenna 1822 and 1823, and modem 1803 corresponds to controller 1818 and 1819 and connects to antenna 1824 and 1825. In an ideal situation, there would be only one wire from computational processor 1812 going to each of the six controllers. In some embodiments, a metallic cone is placed above and below each of the dual-band beam switching FSS antennas. In some embodiments, each of the dual-band beam switching antennas are placed in a radome. In some embodiments, each modem performs two, three, or multiple channel carrier aggregation on the 4G LTE signals received and thus are LTE-Advanced capable.

Device 1800 also includes one WiFi antenna 1833 which is used to connect to WiFi hotspots. The WiFi antenna is connected to modem 1801 via an SMA connector. In some embodiments, multiple WiFi antennas are used and each of them separately connected to modem 1801, modem 1802, and/or modem 1803 via their own SMA connector. Device 1800 also contains a Global Positioning System (GPS) 1826 so the longitude and latitude location information of the current position of the device 1800 (and hence the vehicle) is known. The GPS 1826 uses a GPS antenna 1827 to properly get the current GPS data. The GPS antenna 1827 is connected to the GPS 1826 via an SMA connector. The computational processor 1812 receives the current GPS coordinates and saves them into a database 1828. The GPS data includes the current latitude and longitude, the current altitude, the current acceleration, speed, and direction, and the number of GPS satellites used to provide the information. The current GPS data and best direction of radiation found for each carrier are saved into the database 1828. In addition, any signal drops for each carrier that may occur and the corresponding GPS location at which it occurs are saved into the database 1828. Power circuitry 1808 draws power from power supply 1809 to provide power to modem 1801, modem 1802, modem 1803, bonder 1804, wireless router 1806, computational processor 1812, display 1813, controller 1814, controller 1815, controller 1816, controller 1817, controller 1818, controller 1819, GPS 1826, and GPS antenna 1827. The antennas 1820, 1821, 1822, 1823, 1824, and 1825 draw power from their corresponding controller. In some embodiments, it is possible to use multiple power supplies 1809 and have each one only power certain components. In some embodiments, more or less than three modems are used. In these embodiments, twice the number of antennas and antenna controllers than the number of modems are needed.

Device 1800 allows cellular phones and computers in the vehicle or nearby to receive cellular communications. This can allow for better voice and data communications amongst EMS and FRs. This can allow for uninterrupted HD video streaming of the patient, high resolution image uploads, clear audio communications, and important patient data to be sent to hospital, doctor office, or other sites, particularly where the patient is being transferred to. In addition, EMS can receive important patient information from the patient's electronic medical records and other data sets at prior treating sites. Further, EMS can access medical journals, book, and reference sources that may be important to best treating the patient and keeping them healthy. Information to and from the public can also be better communicated.

Figure 15:
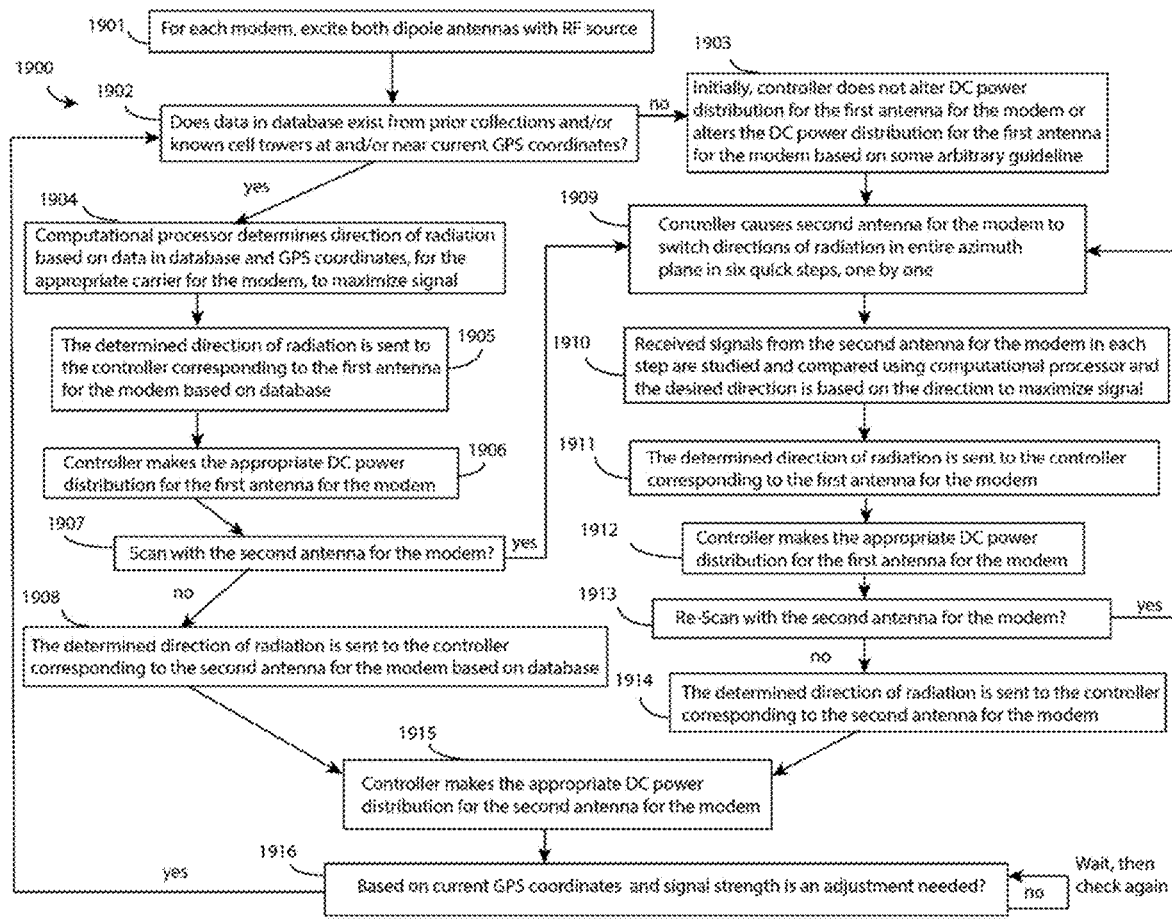
FIG. 15 is a flow chart of exemplary steps used for using two dual-band beam switching antennas with one modem in connection with the device in FIG. 13 and FIG. 14 according to an embodiment of the inventive concepts disclosed herein.

Databases currently exist to determine where existing cell towers are near locations. However, data has not yet been used in a manner to determine the best direction to point an antenna and then actually point the antenna in that direction for use with 3G/4G/LTE. FIG. 15 is a flow chart illustrating exemplary steps in a method 1900 for using two dual-band beam switching FSS antennas for one modem corresponding to a specific cellular carrier in conjunction with either device 1700 and device 1800 or embodiments thereof. The flow chart presents how to use location information, known cell tower locations, and obtained signal strengths, to determine the optimal direction to point an antenna to have the greatest signal strength. For example, two dual-band beam switching FSS antennas such as 1820 and 1821 corresponding to modem 1801 and controllers 1814 and 1815 can follow method 1900. This method is performed by a programmable computer, processor, programmable controller, PLC, FPGA, laptop, or other suitable device. In step 1901, both dipole antennas in the dual-band beam switching FSS antennas corresponding to one modem are excited with an RF source. In step 1902 a check is made to see if data currently exists in the database from prior collections and/or known cell towers at and/or near the current GPS coordinates provided by GPS 1826. If no data exists in step 1902, then in step 1903 the controller for the first dual-band beam switching FSS antenna does not alter the DC power distribution or alters the DC power distribution based on some arbitrary guideline. For example, an arbitrary guideline is to have the controller make the appropriate DC power distribution of the diodes of both the inner and outer FSS layers so the direction of radiation is pointing north or closest to north from the six possible directions.

If data exists in step 1902, then in step 1904 the computational processor 1812 determines the direction of radiation based on data in the database and GPS coordinates, for the appropriate carrier for the modem, to maximize the signal. It is possible to use the GPS coordinates to determine how close the vehicle currently is to any known cell towers for the carrier in the area nearby. If a known cell tower for the carrier is found to be the closest, the direction of radiation and the transmission and reception of EM waves or RF signals towards the nearest cell tower for that carrier would maximize the signal. When a vehicle drives at a location already traveled in the database, this information, such as the direction that maximizes signal from prior scans with dual-band beam switching FSS antennas, is utilized to determine the direction of radiation for that carrier which would maximize the signal. It is also possible to use the computational processor 1812 to look slightly forward in time of where the vehicle is about to travel and determine the future direction of the road. Based on the terrain, such as any turns or curves ahead, the direction of radiation that would maximize the signal is predicted slightly ahead of time of where the vehicle is about to travel. By seeing slightly ahead, previous routes traveled and known locations of cell towers coming up in the area are used based on the speed of the vehicle, terrain ahead, and geometry to adjust the radiation direction without necessarily needing to perform any scans with the second dual-band beam switching FSS antenna. In step 1905, data associated with the determined direction of radiation and the transmission and reception of EM waves or RF signals from step 1904 is sent to the controller corresponding to the first dual-band beam switching FSS antenna. In step 1906 the controller corresponding to the first dual-band beam switching FSS antenna makes the appropriate DC power distribution of the diodes of both the inner and outer FSS layers of the first dual-band beam switching FSS antenna so the direction of radiation and the transmission and reception of EM waves or RF signals is pointing towards the determined direction that maximizes signal for that carrier for the modem.

In step 1907 a check is made to see if a scan is to be performed with the second dual-band beam switching FSS antenna. This decision is based on current GPS coordinates, information in the database, the current signal strength, and the current needs of the personnel in the vehicle. This decision can also be based on the other carriers for the other modems and their current signal strengths (when present) and information in the database. This decision can also be made depending on if one wants both dual-band beam switching FSS antennas to be used for reception without having to have one search. It is possible in some areas that one antenna is in a null and only one antenna would receive a signal that provides adequate reception. The antennas would be placed far enough apart so both would not be expected to be in a null at the same time. Having two antennas on the same carrier with the same modem pointing in the same direction prevents against null cases where one antenna does not receive adequate reception. In step 1907 if it is determined that an additional scan is not needed to determine the radiation direction, then in step 1908 data associated with the direction of radiation and the transmission and reception of EM waves or RF signals determined in step 1904 is also sent to the second controller corresponding to the second dual-band beam switching FSS antenna. Then step 1915 occurs and the controller corresponding to the second dual-band beam switching FSS antenna makes the appropriate DC power distribution of the diodes of both the inner and outer FSS layers of the second dual-band beam switching FSS antenna so the direction of radiation and the transmission and reception of EM waves or RF signals is pointing towards the determined direction that maximizes signal for that carrier for the modem found in step 1904. In step 1907 if it is determined that an additional scan is needed to determine the radiation direction, then in step 1909 the controller causes the second dual-band beam switching FSS antenna to switch directions of radiation in the entire azimuth plane in six quick steps, one by one. Step 1909 also occurs after step 1903.

In step 1910, the received signals from the second dual-band beam switching FSS antenna in each of the six directions is studied and compared using the computational processor 1812 to determine which direction of radiation and the transmission and reception of EM waves or RF signals to use. The direction to use is typically the direction that maximizes the signal for the appropriate carrier for the modem. In step 1911 data associated with the determined direction of radiation and the transmission and reception of EM waves or RF signals from step 1910 is sent to the controller corresponding to the first dual-band beam switching FSS antenna. In step 1912 the first controller makes the appropriate DC power distribution of the diodes of both the inner and outer FSS layers of the first dual-band beam switching FSS antenna so the direction of radiation and the transmission and reception of EM waves or RF signals is pointing towards the determined direction that maximizes signal from step 1910 from the scan. Thus, as the vehicle is driven, the first dual-band beam switching FSS antenna used for current reception can have its direction adjusted by the corresponding controller based on the signal strength in the six possible directions of the 3G/4G/LTE signal found by the second dual-band beam switching FSS antenna connected to the same modem. In this case, the first dual-band beam switching FSS antenna used for current reception is adjusted by the controller to point in the direction of the strongest signal for the specific carrier found through the use of searching by the second dual-band beam switching FSS antenna in all six possible directions.

In step 1913 a check is made to see if an additional scan is to be made for the second dual-band beam switching FSS antenna. If an additional scan is to be made, then step 1909 is repeated. In some cases, this additional scan may occur after a slight amount of waiting for a period of time. If an additional scan is not to be made, then step 1914 occurs and data associated with the determined direction of radiation and the transmission and reception of EM waves or RF signals from step 1910 is sent to the controller corresponding to the second dual-band beam switching FSS antenna. After step 1914, step 1915 occurs and the controller corresponding to the second dual-band beam switching FSS antenna makes the appropriate DC power distribution of the diodes of both the inner and outer FSS layers of the second dual-band beam switching FSS antenna so the direction of radiation and the transmission and reception of EM waves or RF signals is pointing towards the determined direction that maximizes signal for that carrier for the modem found in step 1910 from the scan. Lastly, step 1916 performs a check to see if based on the current GPS coordinates and signal strength for the carrier if any adjustment is needed. If no adjustment is needed, then waiting is performed for a period of time and check is again made at a later time (as in wait and then perform step 1916 again). If an adjustment is needed in step 1916, then proceed back to step 1902. For example, an adjustment may be needed when a signal drops or the signal strength becomes very weak.

Method 1900 is a specific embodiment and it is possible in other embodiments to perform the various steps in a different order such as checks on whether or not to scan with the second antenna and/or add in additional steps or remove some steps. These alternative embodiments still encapsulate the scope and spirit of the invention. Numerous steps in method 1900 are skipped and not executed for different dual-band beam switch FSS antennas and their controllers corresponding to specific modems with the appropriate carrier(s) depending on the nearby cell tower information and GPS coordinates. It is possible, based on the cell towers nearby for all carriers, to modify the bonder to use only one carrier or multiple carriers as an aggregate based on the cell towers locations. For example, if in an area where only Verizon cell towers are nearby, then the bonder would only use the dual-band beam switching FSS antennas connected to the modem for Verizon and the other dual-band beam switching antennas would not need to search, would not need to have their controllers make DC power distributions, and would not even need to have their dipole antennas excited with an RF source. In some embodiments it is possible to transmit and receive EM waves or RF signals using more or less than two diodes in each of six adjacent inner FSS columns and fifteen diodes in each of sixteen adjacent outer FSS columns in each antenna by having those diodes in the off state, but the preferred embodiment is with two diodes in each of six adjacent inner columns and fifteen diodes in each of sixteen adjacent outer columns in each antenna. However, in such an alternative embodiment, the method 1900 may need to be modified to account for the differences in which diodes are powered on or off in the antenna(s). For example, in other embodiments, the amount of steps in step 1909 needed to scan the entire azimuth plane are more or less than six.

Such a system using device 1700 and 1800 and method 1900 can help suggest the best routes to travel in the future for vehicles through a specific region or area so that signal strength is maximized over the travel distance. The data and information on signal strength provides feedback and guidance for future public safety personnel in the area. For example, when two separate routes have a similar distance of travel required, the route is selected prior to travel, based on which one provides a better 3G/4G LTE signal by using information stored in the database 1828. In some embodiments, the current latitude, longitude, altitude, direction, acceleration, velocity, and other metadata about the vehicle is communicated and sent to a remote command center. The command center can use this information, information stored in the database 1828, and information about other vehicles in their fleet, to direct the vehicle to travel a certain route. The display 1813 can also provide information to the user about which route to select prior to undertaking it based on information in the database 1828. The display 1813 also can run an application using computational processor 1812 to inform any passengers in the vehicle in front of the display where they are located on a map and where they are traveling to on the map. In some embodiments, the current latitude, longitude, altitude, direction, acceleration, velocity, and other metadata about the vehicle is communicated and sent to a remote support center. The remote support center can monitor any devices in use, see where the vehicles are located, determine usage, determine signals levels, and provide remote administration and updates of software as needed. In some embodiments, the remote support center can put the position of the current vehicle and other vehicles with the device 1700 and 1800 on a single map with the position of each updated every 30 seconds. In some embodiments, the remote support center can also provide automatic firmware updates to the device 1700 and 1800.

Figure 16:
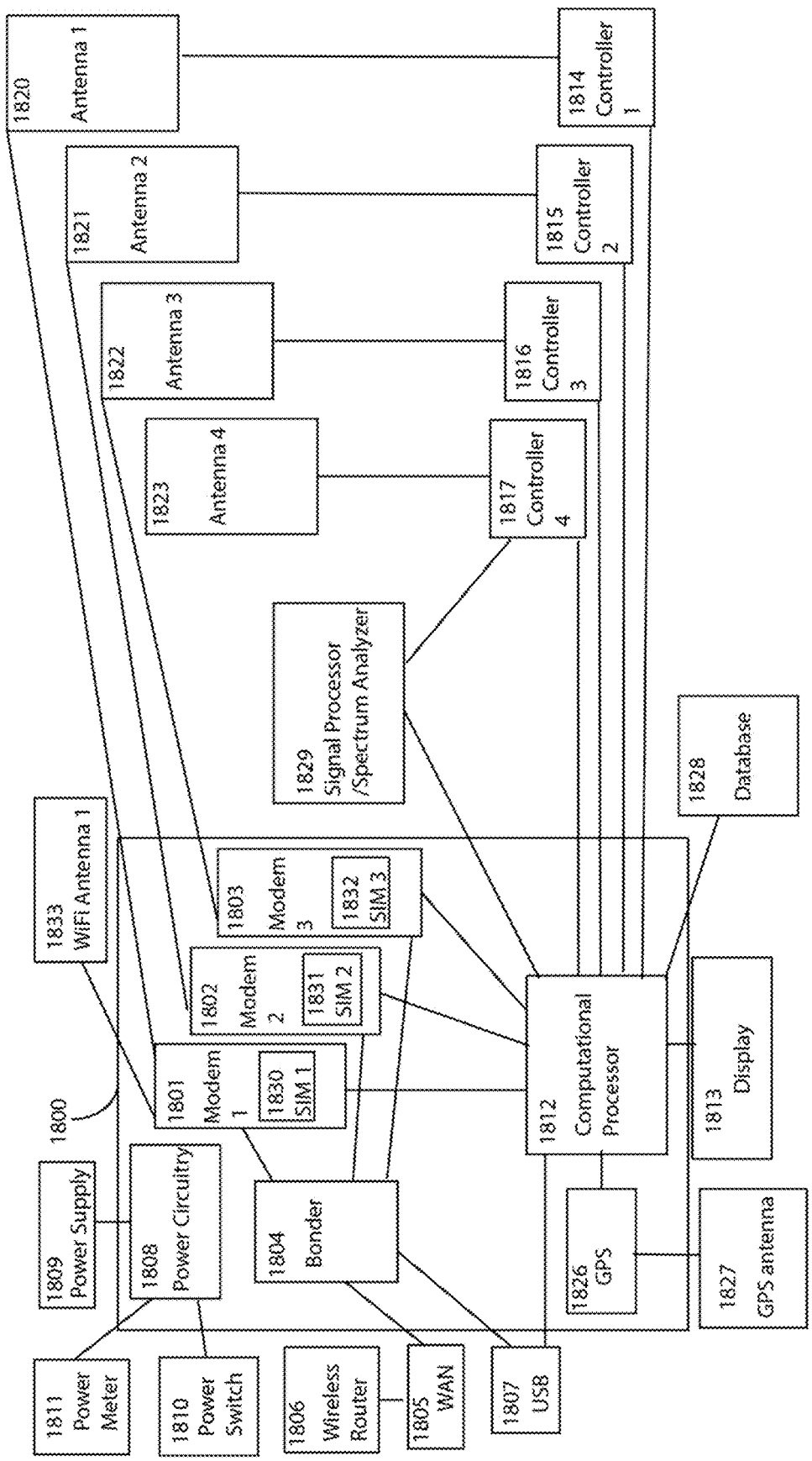
FIG. 16 is a schematic of a device utilizing four dual-band beam switching antennas with three modems and a signal processor/spectrum analyzer according to an embodiment of the inventive concepts disclosed herein.

In an alternative embodiment and arrangement than that in device 1800, four antennas are used as illustrated in FIG. 16. Three of the antennas are used for current reception with one for each carrier connecting to each of the three modems. The last antenna is used for scanning in all directions to determine the maximal signal strength for all three carriers. This differs from the prior arrangement where each carrier had their own searching antenna. The fourth antenna that searches is not connected to any of the modems. This arrangement requires more computational power and can require a special signal processor and/or spectrum analyzer which is more expensive. This is illustrated in FIG. 16 by the addition of the signal processing/spectrum analyzer box 1829 which connects to controller 1817 and antenna 1823 on one side and computational processor 1812 on the other side. In some embodiments, the computational processor 1812 uses the information from the signal processor and spectral analysis to find the maximal signal strength for each carrier. After this is found, the computational processor 1812 adjusts the first three controllers so that the corresponding antennas point in the direction of the maximal signal strength for the appropriate carrier.

Figure 17:
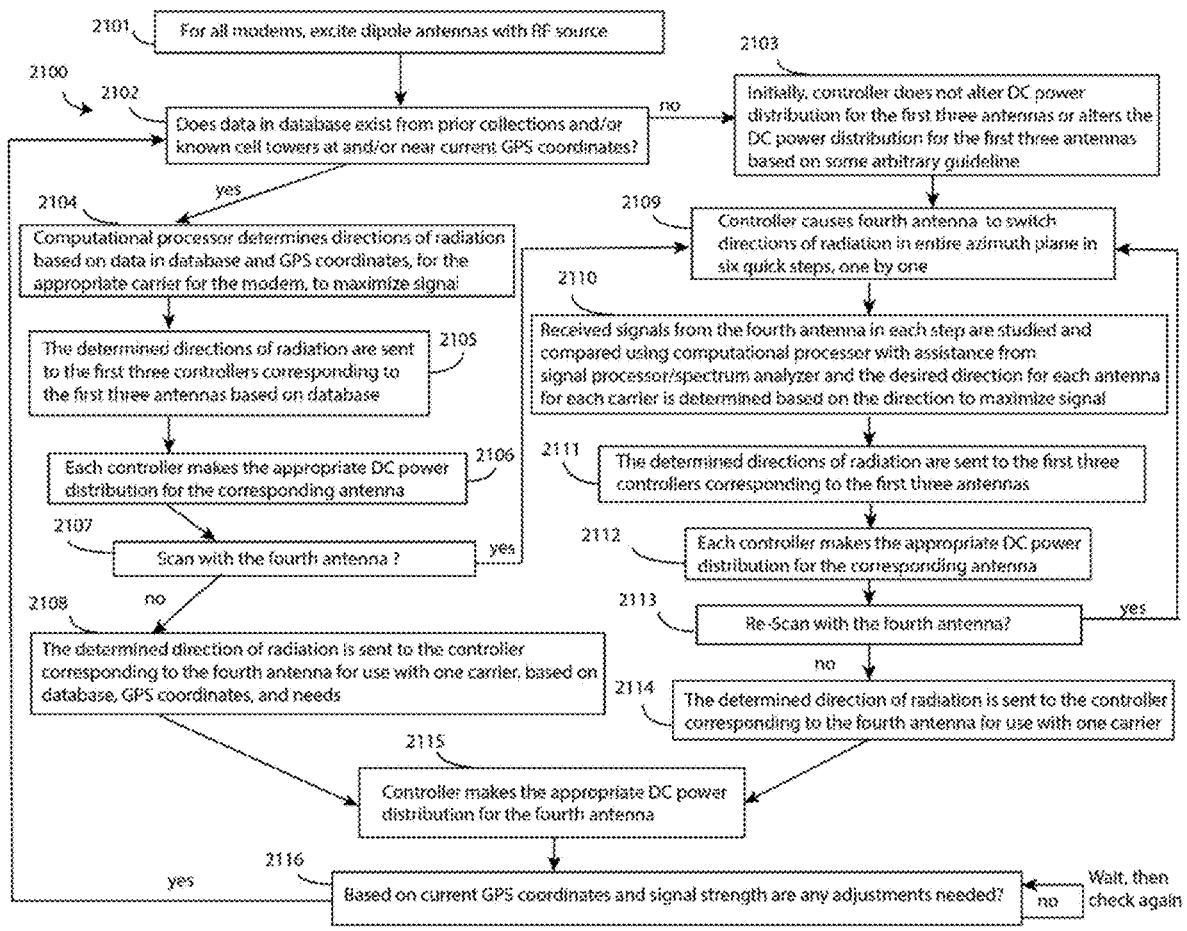
FIG. 17 is a flow chart of exemplary steps used for using four dual-band beam switching antennas with three modems and a signal processor/spectrum analyzer in connection with the device in FIG. 16 according to an embodiment of the inventive concepts disclosed herein.

FIG. 17 is a flow chart illustrating exemplary steps in a method 2100 for using four dual-band beam switching FSS antennas in conjunction with device 1800 in the alternate embodiment in FIG. 16. Method 2100 is similar to method 1900 in many ways. The main difference is the first three antennas are each connected to one modem and their directions of radiation and the transmission and reception of EM waves or RF signals are determined from either the database or by the use of the fourth dual-band beam switching FSS antenna and signal processor/spectrum analyzer. In step 2110 the computational processor determines the direction of radiation and the transmission and reception of EM waves or RF signals for each antenna for each carrier by studying the signals spectrum and comparing the received signals from the fourth antenna in all directions. This step requires three separate direction determinations and also involves looking at the specific frequencies of the signals that are received. This is unlike method 1900 where it is not necessary to also determine the frequencies that the signals are present at since each carrier has their own dual-band beam switching FSS antenna that can scan in all six directions.

The advantage of device 1800 is that it does not require the use of an unlocked cellular phone and spending minutes without coverage switching to a different SIM card while traveling. In addition, it may not always be possible to know which carrier provides the best signal strength at a specific location and even if it was known it would require checking the display of multiple phones instead of being able to use just one display. If using multiple cell phones, one would have to switch to a different cell phone and carrier mid-travel. In this case calls would have to be ended and started again, sometimes numerous times during travel. In the U.S. a single unlocked cell phone and a super SIM card that can work with all carriers in one phone does not exist.

VI. Applications: Directable Antenna for Digital TV

Another particular area of application for the antenna of 100 is in TV broadcasting and using the antenna of 100 to receive over-the-air (OTA) TV channels. There tends to be weaker TV signals in most communities outside of major urban areas. Most TV transmitters or towers tend to be concentrated in urban areas. Directional antennas are required to receive weaker signals outside of major urban areas and point towards the correct location. The current process of antenna installation and tuning an antenna to point to the correct location is cumbersome and often a safety issue for the home installer. Typically, an antenna is installed on the roof of a house or in the attic. Tuning the antenna to point to the correct location may require a person to go up and down a ladder many times in order to test out the reception on a TV for the new placement of the antenna before an optimal or near optimal antenna location is found. Further compounding the issue, is that different broadcast TV station towers or transmitters may locate in different directions and require the direction of the antenna is adjusted for each channel to provide the best reception. Also compounding the issue is TV reception uses a wide-band, low noise, amplifier to improve signal acquisition often leading to mediocre reception. Weaker signals may not get amplified enough and stronger signals may get over amplified. Use of the dual-band beam switching FSS antennas used together with other components allows for the best reception possible of OTA TV channels by directing the antenna in the appropriate direction. Additionally, more channels will be found than conventional antennas due to the high gain characteristic. In some cases the same channel in different geographical regions can be found, such as the ABC network in all of Annapolis, Washington D.C., and Baltimore for someone located in Southern Maryland.

Most OTA TV channels operate at either Ultra high frequency (UHF) and/or Very high frequency (VHF) with signals operating at frequency bands shown in Table VI to provide coverage in the U.S. This is not an all-inclusive list; however, of all the UHF and VHF frequency bands used throughout the world. For use with both UHF and VHF frequencies, the antenna 100 ideally provides high gain at a lower frequency band between 54 and 216 MHz, and at a higher frequency band between 470 and 890 MHz. In an embodiment, the dimensions of the antenna 100 are altered so that the antenna 100 provides high gain near and within the frequency bands or a subset of the frequency bands listed in Table VI. In another embodiment, the dimensions of the antenna 100 are set for a subset of the frequencies listed in Table VI which cause the dual-band beam switching FSS antenna to become a single-band beam switching FSS antenna. In such an embodiment, the antenna 100 may only provide high gain for UHF frequencies.

The beam switching FSS antenna can provide power to just a specific direction instead of all directions as it is electronically steerable. As TV transmitters or towers are typically located in certain directions away, using the beam switching FSS antenna to selectively point towards a TV transmitter or tower can thus raise the gain, improve the signal to noise ratio (SNR), and boost the signal strength allowing for clear TV reception.

Figure 18:
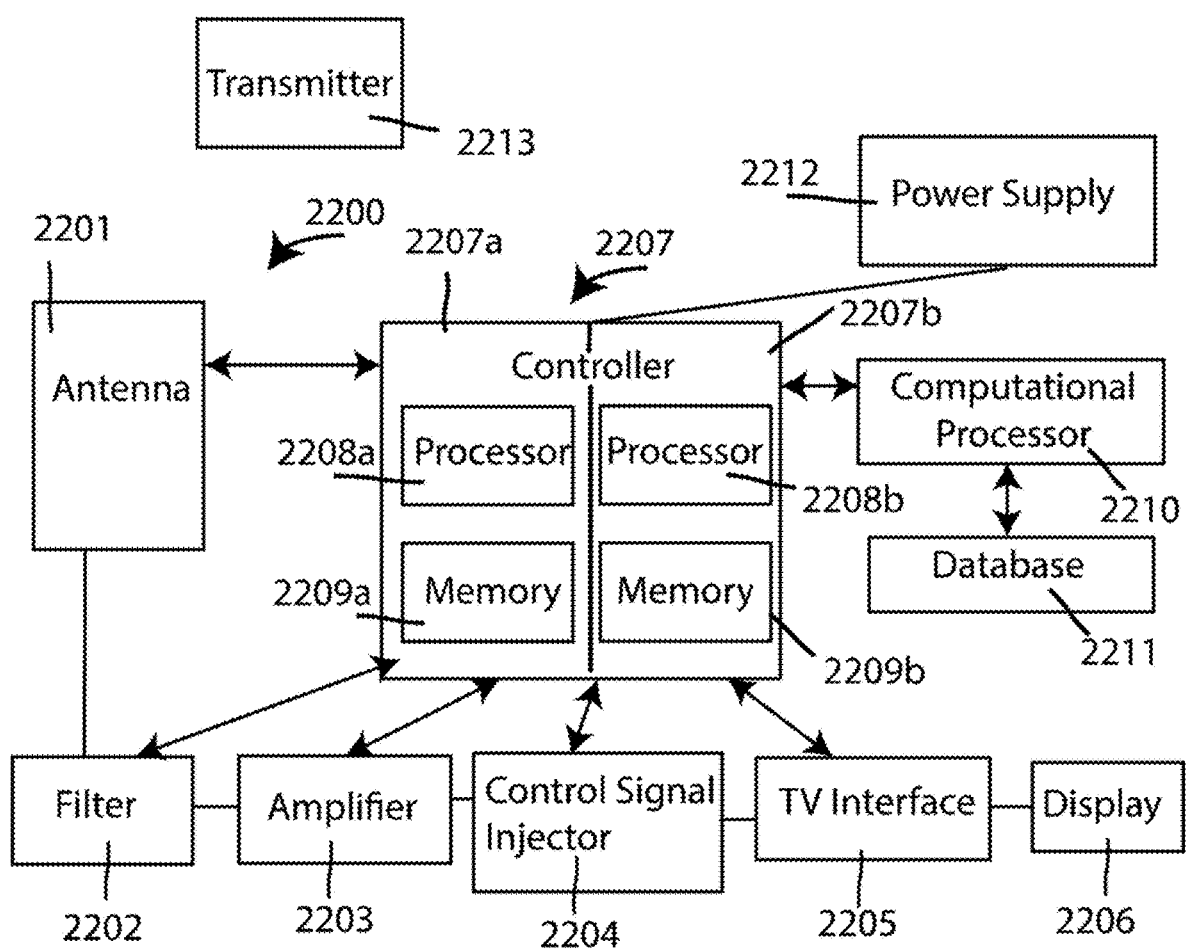
FIG. 18 is a schematic of a system utilizing a beam switching antenna and a display according to an embodiment of the inventive concepts disclosed herein.

According to an embodiment in FIG. 18, a device 2200 is used in conjunction with a television or another form of display for television signals in a building or a home and with an antenna on a roof or in an attic. The device 2200 comprises an antenna 2201 which is preferably a dual-band beam switching FSS antenna 100 or a single-band beam switching FSS antenna. The antenna 2201 is configured to receive EM waves or RF signals in varied directions. The device 2200 comprises a filter 2202 configured to provide better noise characteristics and filter out unwanted interface. In the preferred embodiment, the filter 2202 is configured to bandpass filter received EM waves or RF signals around a tuned channel center frequency. The bandwidth of the filter is expected to match or closely match the bandwidth of a received EM wave or RF signal. The device 2200 comprises an amplifier 2203 configured to boost signal strength and provide the best gain for each channel to overcome cable degradation from the antenna 2201 to the display 2206. In the preferred embodiment, the amplifier 2203 is a variable gain signal amplifier. The device 2200 comprises a control signal injector 2204 configured to allow low frequency signals to be passed to the antenna 2201 using the same wire as the received EM waves or RF signals. In the preferred embodiment, the control signal injector 2204 is connected to the amplifier 2203 which is connected to the filter 2202 which is connected to the antenna 2201 using the same RG/6 RF cable and then in turn connected to the TV interface 2205 which is connected to the display 2206 and in then turn also connected to the controller 2207, and allows for power to these devices. In certain embodiments the control signal injector 2204 may not be present and required. The device 2200 comprises a TV interface 2205 which is configured to receive and demodulate signals. The device 2200 comprises a display 2206 which is configured to display different OTA TV channels for the received EM waves or RF signals or the received demodulated amplified filtered EM waves or RF signals. In the preferred embodiment, the TV interface 2205 is connected to the display 2206 using HDMI or another specification interface that supports digital display. The display 2206 is also configured to transmit audio for different OTA TV channels for the received EM waves or RF signals or received demodulated amplified filtered EM waves or RF signals.

The device 2200 comprises a controller 2207 configured to control active elements on frequency selective surfaces of the antenna 2201 to cause the antenna to receive EM waves or RF signals in varied directions. The controller 2207 is further configured to control the settings for the filter 2202, the amplifier 2203, the control signal injector 2204, and the TV interface 2205. The controller 2207 is configured to set the center frequency the filter 2202 uses to filter the EM wave or RF signal received by the antenna 2201. The controller 2207 is configured to set the gain the amplifier 2203 uses to improve the signal strength of the EM wave or RF signal received by the antenna 2201 after it has been filtered by the filter 2202. The controller 2207 may include subcontrollers 2207a and 2207b. The subcontrollers may be configured to perform different control functions. The subcontroller 2207a may comprise a processor 2208a and memory 2209a to allow it to perform its control functions. The subcontroller 2207b may comprise a processor 2208b and memory 2209b to allow it to perform its control functions. Alternatively, the subcontroller 2207 may not include subcontrollers to perform its control functions or may include more than two subcontrollers. In the preferred embodiment, the TV interface 2205 is connected to the controller 2207 using a USB or network interface. The device 2200 comprises a computational processor 2210 which receives EM waves or RF signals from the controller 2207 and data from the database 2211. The computational processor 2211 is configured to analyze received EM waves or RF signals and is further configured to perform comparisons to determine which direction of the received EM waves or RF signals provide maximal TV reception for each channel. The data in database 2211 may be prior collected and processed received EM waves or RF signals, TV transmitter location information, TV channel programming information, the direction to point the antenna towards to provide the best reception for each channel, the best center frequency to filter each channel, and the best gain value to use for the amplifier for each channel. The system 2200 comprises a 24 V power supply 2212 to provide power to the controller 2207 and associated components including the antenna 2201, filter 2202, amplifier 2203, control signal injector 2204, and TV interface 2205.

The controller 2207 is further configured to receive data associated with the desired direction of the reception of EM waves or RF signals from the computational processor 2210. The amplifier 2203 is further configured to set the best gain value after the computational processor 2201 has analyzed signal levels received from the TV interface 2205. The signal levels and channel quality can be used to determine if the gain is maximized and not-over saturating the TV interface 2205. The computational processor 2210 may comprise one or more subprocessors. The computational processor 2210 is not just limited to one processor and may contain at least two processors which employ parallel computing techniques. In addition, the computation processor 2210 may comprise both central processing units and graphics processing units. The computation processor 2210 and database 2211 may be remote from the antenna 2201, controller 2207, and display 2206. The antenna 2201 is further configured to receive EM waves or RF signals from a transmitter 2213. In an embodiment, the transmitter 2213 may include more than one transmitter. The transmitter 2213 is configured to broadcast a signal for a specific OTA TV channel at UHF and/or VHF with signals operating at frequency bands shown in Table VI. The transmitter 2213 may be located at different distances and angles away from the antenna 2201.

Figure 19:
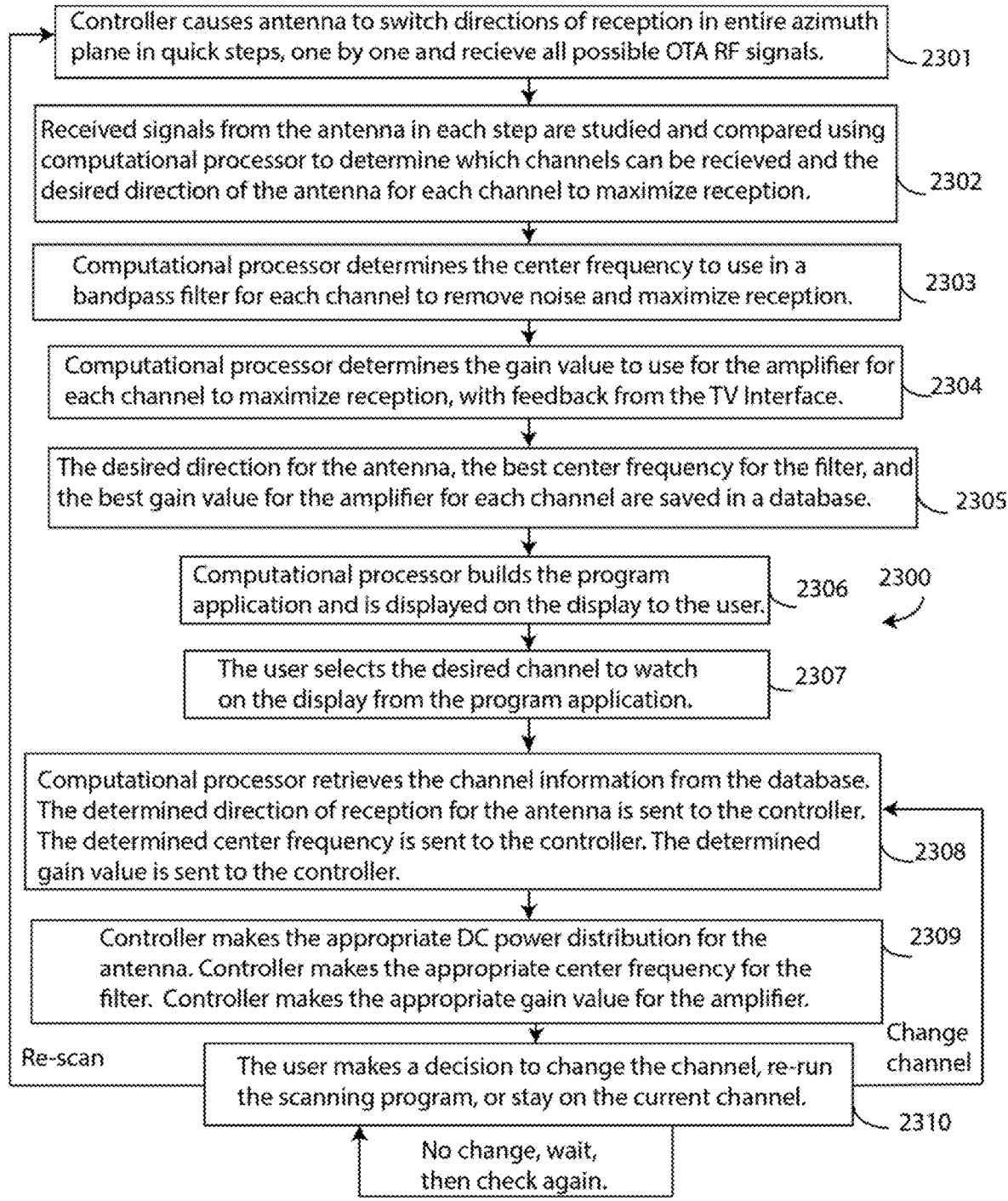
FIG. 19 is a flow chart of exemplary steps used for a system using a beam switching antenna and a display according to an embodiment of the inventive concepts disclosed herein.

The exemplary steps in a method 2300 for using the system utilizing a beam switching FSS antenna with a display shown in FIG. 18 is described in FIG. 19. First, in step 2301, a scanning program is run for each channel using the antenna and the controller. The scanning program causes the antenna to switch directions of reception in the entire azimuth plane in quick steps. The scanning program attempts for the antenna to receive all possible OTA EM waves or RF signals corresponding to all possible channels able to be broadcast and received by TV transmitters or towers. In an embodiment with the dual-band beam switching FSS antenna 100, in step 2301, the antenna is pointed in six different direction every sixty degrees for each possible channel. In such an embodiment, the controller make the appropriate DC power distribution of the diodes of both the inner and outer FSS layers so the direction is pointing one by one towards all possible six directions of reception of EM waves or RF signals. Next, in step 2302, the received signals from the antenna in each step are studied and compared using a computational processor to determine which channels can be received. Then, the direction the antenna points corresponding to the best reception for each receivable channel is determined by the computational processor and later saved in a database in step 2305. Furthermore, multiple geographical areas for each channel are allowed in the scan. Once the direction for optimal reception of a channel is made, in step 2303, the computational processor will determine the center frequency to use for a tunable narrow-bandpass filter applied to each channel to further maximize reception. The best center frequency to filter each channel to provide the best reception is later saved in the database in step 2305. The filter allows for aircraft noise, electrical noise, other nearby transmitters, and other electrically noisy signals to be effectively removed. Removing noise improves the distance a channel can be received at and allows for more channels to be received. After the filter setting is determined, in step 2304, the computational processor will determine the best gain value to use for the amplifier to provide optimal reception and the best gain value for each channel will later be saved in the database in step 2305. This allows for both weaker and stronger signals to get the best gain possible. Furthermore the TV interface will provide to the computational processor signals to feedback into the best gain value found. After the scanning program is complete and the optimal direction to point the antenna, the best center frequency to filter, and the best gain value for amplification, these are saved for each receivable channel in the database in step 2305. Next, in step 2306 the computational processor builds a program guide application using the data in the database. The program guide application allows the user of the display to find out which channels can be received and watched. The program guide application can also tell the user exactly what program or television show is on each channel. Next in step 2307, a user changes the channel of the display using the program guide application. In step 2308, the computational processor retrieves the channel information for the channel that has been selected by the user from the database. The determined direction of reception for the antenna is sent to the controller. The determined center frequency is sent to the controller. The determined gain value is sent to the controller. In step 2309, the controller makes the appropriate DC power distribution for the FSS layer and/or layers of the antenna and the antenna is adjusted based on the prior found best signal strength and corresponding direction automatically. Furthermore, the controller makes the appropriate settings for the center frequency for the filter and the appropriate gain value for the amplifier to provide the best reception of the channel selected. The pointing of the antenna to the correct location occurs in nanoseconds after being told what channel to use on the display. A single remote to control channels on the display can be used and the system does all the tuning and signal processing seamlessly. In step 2310 the user makes a decision about what to do after having watched the current channel on the display. If the user is not happy with the reception of the current channel the user may perform a re-scan and step 2301 repeats. If the user wants to watch a different program or television show, such as on a different channel on the display, the user can change the channel and step 2308 occurs. If the user is happy with the current channel then nothing occurs until the user makes a different decision at a later point in time.

In an embodiment, part of the system 2200 including the filter 2202 and amplifier 2203, can be located in one single physical device. In another embodiment, the TV interface 2205 and the controller 2207 or a subcontroller 2207a or 2207b, can be located inside the display 2206. In a further embodiment, the computational processor 2210 and the database 2211, can be located in the display 2206. In another embodiment the system 2200 can be combined with streaming services including Netflix, Hulu, HBO Now, Amazon Prime, and CBS All Access and provide an integrated program guide application. In another embodiment, the system 2200 allows the user to record a program on a certain channel and watch on the display 2206 at a later point in time than when it was broadcast OTA. In another embodiment, the system 2200 comprises LED indicator lights placed on or near the antenna. The LED lights may indicate the direction of reception for the antenna 2201, the center frequency setting for the filter 2202, and/or the gain level setting for the amplifier 2203. For example, the LED lights are turned on in places where the antenna is receiving an EM wave or RF signal and turned off in places where the antenna is not receiving an EM wave or RF signal. A separate LED status bar indicates the center frequency setting for the filter 2202 and the gain level setting for the amplifier 2203. In a further embodiment, the system further comprises decoding hardware on the antenna 2201 to allow it to understand how to translate a received EM wave or RF signal from the controller 2207 into a desired direction of reception of EM waves or RF signals by adjusting active elements on FSSs. In another embodiment, the computational processor 2210 is configured to receive information from the internet including TV transmitter location information and TV channel programming information. In another embodiment, different types of filters may be used by the filter 2202 and not just a tunable narrow-bandpass filter.

The number and arrangement of components described is varied to suit a particular application. The invention is not limited to the specific embodiments herein and it will be understood by those skilled in the art that variations and modifications can be effected within the sprit and scope of the inventive concepts.

We claim:

1. A directable antenna system comprising:
   at least one directable antenna, configured to direct reception of electromagnetic waves based on information stored in a searchable database;
   wherein the at least one directable antenna comprises:
      an omnidirectional antenna at a center; and
      a frequency selective surface centered around the omnidirectional antenna;
   at least one antenna controller, configured to control active elements on the frequency selective surface of the at least one directable antenna to direct the antenna in a desired direction based on information stored in the searchable database;
   a filter configured to bandpass filter received signals;
   an amplifier configured to amplify received signals; and
   a TV interface configured to demodulate received signals;
   a computational processor configured to process received signals; and
   the searchable database containing stored data; and
   wherein the computational processor is further configured to search the database; and
   wherein the searchable database containing stored data includes prior received and analyzed signals, TV tower information, TV channel programming information, directions to point the antenna towards for best reception, best center frequencies to filter, and best gain values to amplify.

2. The directable antenna system of claim 1, wherein the at least one antenna controller is further configured to control on and off states of active elements on frequency selective surfaces of the at least one directable antenna to direct the reception of electromagnetic waves towards active elements that are in an off state.

3. The directable antenna system of claim 1, wherein the at least one directable antenna is configured to direct the reception of electromagnetic waves in varied directions; and
   the computational processor is further configured to perform received signal analysis on signals received.

4. The directable antenna system of claim 3, wherein the at least one directable antenna is further configured to direct the reception of electromagnetic waves based on the received signal analysis.

5. The directable antenna system of claim 4, wherein the at least one directable antenna is further configured to direct the reception of electromagnetic waves towards a direction of maximum signal.

6. The directable antenna system of claim 1, further comprising a display configured to display over the air television channels.

7. A directable antenna system comprising:
   at least one directable antenna, configured to direct reception of electromagnetic waves based on information stored in a searchable database;
   wherein the at least one directable antenna comprises:
      an omnidirectional antenna at a center; and
      a frequency selective surface centered around the omnidirectional antenna;
   at least one antenna controller, configured to control active elements on the frequency selective surface of the at least one directable antenna based on information stored in the searchable database;
   a computational processor configured to process received signals; and
   the searchable database containing stored data; and
   wherein the computational processor is further configured to search the database,
   wherein the frequency selective surface further comprises
      an inner frequency selective surface centered around the omnidirectional antenna; and
      an outer frequency selective surface, wherein the outer frequency selective surface is concentric to and spaced from the inner frequency selective surface; and
   wherein the at least one directable antenna is further configured to direct transmission of electromagnetic waves.

8. The directable antenna system of claim 7, further comprising:
   a global positioning system receiver configured to determine a current location; and
   at least one modem configured to receive signals;
   wherein the searchable database containing stored data includes prior location information, prior received and analyzed signals, and cell tower information.

9. The directable antenna system of claim 8, further comprising a radome comprising at least one layer of a material configured to allow the transmission and reception of electromagnetic waves.

10. The directable antenna system of claim 8, further comprising a display configured to display signal strength.

11. The directable antenna system of claim 8, further comprising a bonder configured to aggregate multiple received signals into one signal.

12. The directable antenna system of claim 8, further comprising a spectrum analyzer configured to analyze received signals, wherein the computational processor is further configured to process signals analyzed by the spectrum analyzer.

13. The directable antenna system of claim 8, wherein the at least one directable antenna is further configured to have a high gain at a lower frequency band between 700 MHz and 1100 MHz and a high gain at a higher frequency band between 1700 MHz and 2300 MHz.

14. The directable antenna system of claim 7, wherein the inner frequency selective surface is divided into at least two columns comprising frequency selective material, wherein each column of the at least two columns either blocks or allows transmission of electromagnetic waves, depending on a state of active elements; and
   wherein the outer frequency selective surface is divided into at least two columns, wherein each column of the at least two columns either blocks or allows transmission of electromagnetic waves, depending on a state of active elements.

15. The directable antenna system of claim 14, wherein the at least one antenna controller, is further configured to control active elements in each column of the at least two columns of the inner frequency selective surface and the at least two columns of the outer frequency selective surface to either block or allow transmission of electromagnetic waves; and wherein the antenna controller is programmed to change antenna beamwidth by changing states of active elements of the inner and the outer frequency selective surfaces.

16. The directable antenna system of claim 15, wherein the at least two columns of the inner frequency selective surface and the at least two columns of the outer frequency selective surface comprise at least two metallic strips and at least one resistor, the at least one resistor positioned between the at least two metallic strips, at a top or a bottom of a column of the at least two columns.

17. The directable antenna system of claim 15, wherein each column of the at least two columns of the inner frequency selective surface allows transmission and reception of electromagnetic waves when the active elements are in an off state and in an on state at a lower frequency band and when the active elements are in an off state at a higher frequency band, and each column of the at least two columns of the inner frequency selective surface blocks electromagnetic waves when the active elements are in an on state at a higher frequency band.

18. The directable antenna system of claim 15, wherein each column of the at least two columns of the outer frequency selective surface allows transmission and reception of electromagnetic waves when the active elements are in an off state at a lower and a higher frequency band, and each column of the at least two columns of the outer frequency selective surface blocks electromagnetic waves when the active elements are in an on state at a lower and a higher frequency band.

19. The directable antenna system of claim 15, wherein the transmission and reception of electromagnetic waves is directed towards active elements in an off state.

20. The directable antenna system of claim 15, wherein a direction of the transmission and reception of the electromagnetic waves is caused to vary.

21. A method of directing an antenna beam comprising:
receiving an electromagnetic wave in a desired direction using at least one directable antenna; wherein the at least one directable antenna comprises
an omnidirectional antenna at a center; and
a frequency selective surface centered around the omnidirectional antenna;
controlling active elements on the frequency selective surface of the at least one directable antenna to cause reception of the electromagnetic wave in the desired direction based on information stored in a searchable database containing stored data;
processing received electromagnetic signals; and
searching the database,
wherein the database further comprises at least one of geographic location data, prior best center frequency data, or prior best gain value data.

22. The method of claim 21, further comprising controlling active elements on the frequency selective surface of the at least one directable antenna to transmit an electromagnetic wave in a desired direction based on information stored in the database.

23. A method of directing an antenna beam comprising:
receiving an electromagnetic wave in a desired direction using at least one directable antenna; wherein the at least one directable antenna comprises
an omnidirectional antenna at a center; and
a frequency selective surface centered around the omnidirectional antenna;
controlling active elements on the frequency selective surface of the at least one directable antenna to cause reception of the electromagnetic wave in the desired direction based on information stored in a searchable database containing stored data;
processing received electromagnetic signals; and
searching the database,
wherein the database further comprises at least one of prior location information, prior received and analyzed signals, or cell tower information.

24. The method of claim 23, further comprising controlling active elements on the frequency selective surface of the at least one directable antenna to transmit an electromagnetic wave in a desired direction based on information stored in the database.

* * * * *